United States Patent
Gurney

(10) Patent No.: US 9,103,277 B1
(45) Date of Patent: Aug. 11, 2015

(54) MOMENT-CANCELLING 4-STROKE ENGINE

(71) Applicant: Daniel Sexton Gurney, Santa Ana, CA (US)

(72) Inventor: Daniel Sexton Gurney, Santa Ana, CA (US)

(*) Notice: Subject to any disclaimer, the term of this patent is extended or adjusted under 35 U.S.C. 154(b) by 0 days.

(21) Appl. No.: 14/473,839

(22) Filed: Aug. 29, 2014

Related U.S. Application Data

(60) Provisional application No. 62/020,695, filed on Jul. 3, 2014.

(51) Int. Cl.
*F02B 75/20* (2006.01)
*F02B 75/02* (2006.01)
*F02M 35/10* (2006.01)

(52) U.S. Cl.
CPC .......... *F02B 75/02* (2013.01); *F02M 35/10091* (2013.01); *F02B 2075/027* (2013.01); *F02B 2710/023* (2013.01); *F02M 35/10* (2013.01)

(58) Field of Classification Search
CPC ................... F02B 2710/023; F02B 2710/034; F02B 2720/124; F02B 2720/133; F02B 2720/223; F02B 2720/233; F02M 35/10; F02M 35/10091; F02M 35/10118; F02M 35/10124
USPC ........ 123/184.38, 184.45, 184.52, 52.4, 59.6, 123/311, 316, 86, 432, 191.1, 191.2, 661, 123/193.5, 188.8, 188.1, 188.2, 188.4, 123/188.7; 454/141, 143
See application file for complete search history.

(56) References Cited

U.S. PATENT DOCUMENTS

| | | | |
|---|---|---|---|
| 2,229,788 A | 1/1941 | Appleton | |
| 2,665,675 A * | 1/1954 | Sheppard | 123/188.8 |
| 3,537,437 A | 11/1970 | Paul et al. | |
| 3,680,396 A | 8/1972 | Healy | |
| 3,797,467 A * | 3/1974 | Tenney | 123/73 AA |
| 4,255,929 A | 3/1981 | McDougal | |
| 4,270,500 A | 6/1981 | Nakagawa et al. | |
| 4,432,312 A | 2/1984 | Klomp et al. | |
| 4,481,922 A | 11/1984 | Sugiura | |
| 4,543,931 A | 10/1985 | Hitomi et al. | |
| 4,574,751 A | 3/1986 | Sugiyama et al. | |

(Continued)

FOREIGN PATENT DOCUMENTS

| | | |
|---|---|---|
| CN | 102116227 A | 7/2011 |
| DE | 19861217 B4 | 2/2006 |

(Continued)

OTHER PUBLICATIONS

Fitzgeorge, D, et al., "Air Swirl in a Road-Vehicle Diesel Engine", *Proceedings of the Institution of Mechanical Engineers*, Jan. 1962 vol. 16.

(Continued)

*Primary Examiner* — Erick Solis
*Assistant Examiner* — Anthony L Bacon
(74) *Attorney, Agent, or Firm* — Knobbe Martens Olson and Bear LLP

(57) ABSTRACT

A moment-cancelling, four-stroke engine is disclosed. The engine includes a first cylinder having a first piston and a second cylinder having a second piston, a first crankshaft operably connected to the first piston and a second crankshaft operably connected to the second piston. The first crankshaft rotates in a first direction and the second crankshaft rotates in a second direction that is opposite the first direction to cancel the moments applied to the engine and reduce engine vibration.

11 Claims, 20 Drawing Sheets

(56) References Cited

U.S. PATENT DOCUMENTS

| | | | |
|---|---|---|---|
| 4,577,602 A * | 3/1986 | Showalter | 123/306 |
| 4,726,343 A | 2/1988 | Kruger | |
| 4,760,819 A | 8/1988 | Vorum | |
| 4,972,814 A | 11/1990 | Matsuki et al. | |
| 5,063,899 A | 11/1991 | Hitomi et al. | |
| 5,094,210 A | 3/1992 | Endres et al. | |
| 5,207,210 A | 5/1993 | Yamagata et al. | |
| 5,209,191 A | 5/1993 | Kopec et al. | |
| 5,341,771 A * | 8/1994 | Riley | 123/48 AA |
| 5,511,520 A * | 4/1996 | Regueiro | 123/193.5 |
| 5,531,194 A | 7/1996 | Komatsu et al. | |
| 5,603,299 A * | 2/1997 | Yuzuriha et al. | 123/308 |
| 5,836,273 A | 11/1998 | Hair | |
| 5,873,332 A | 2/1999 | Taue et al. | |
| 5,873,333 A | 2/1999 | Wittner | |
| 5,911,205 A | 6/1999 | Gambardella | |
| 6,053,141 A * | 4/2000 | Mutterer et al. | 123/193.5 |
| 6,062,195 A | 5/2000 | Tanaka et al. | |
| 6,109,234 A * | 8/2000 | Vallance et al. | 123/308 |
| 6,189,493 B1 * | 2/2001 | Gray, Jr. | 123/52.4 |
| 6,371,068 B2 | 4/2002 | Taylor | |
| 6,394,056 B1 | 5/2002 | Woodhouse | |
| 6,431,140 B1 | 8/2002 | Nishimura et al. | |
| 6,508,223 B2 | 1/2003 | Laimbock et al. | |
| 6,536,397 B2 | 3/2003 | Mizutani | |
| 6,655,347 B2 * | 12/2003 | Takamiya et al. | 123/306 |
| 6,745,729 B1 | 6/2004 | Ebanks | |
| 6,772,726 B2 | 8/2004 | Kawamoto et al. | |
| 6,805,087 B2 | 10/2004 | Yakabe et al. | |
| 6,880,509 B2 | 4/2005 | Stuetz et al. | |
| 7,469,671 B2 | 12/2008 | Atsumi | |
| 7,584,724 B2 | 9/2009 | Berger | |
| 7,607,412 B2 | 10/2009 | Alizon et al. | |
| 7,640,908 B2 | 1/2010 | Wessels | |
| 7,703,423 B2 | 4/2010 | Burgess et al. | |
| 7,926,460 B2 | 4/2011 | Alizon et al. | |
| 7,938,099 B2 | 5/2011 | Abe et al. | |
| 8,156,912 B2 | 4/2012 | Kubo | |
| 8,201,534 B2 | 6/2012 | Sato | |
| 8,272,356 B2 | 9/2012 | Haugen et al. | |
| 8,360,028 B2 | 1/2013 | Betzmeir et al. | |
| 8,381,692 B2 | 2/2013 | Islas | |
| 8,387,599 B2 | 3/2013 | McAlister | |
| 8,434,454 B2 | 5/2013 | Park | |
| 8,439,010 B2 | 5/2013 | Fernandez | |
| 8,443,778 B2 | 5/2013 | Dalke | |
| 8,683,973 B2 * | 4/2014 | Raasch | 123/193.5 |
| 2005/0279310 A1 | 12/2005 | Kondo et al. | |
| 2006/0102142 A1 | 5/2006 | Holder et al. | |
| 2009/0038594 A1* | 2/2009 | Naquin | 123/661 |
| 2009/0107426 A1* | 4/2009 | Berger et al. | 123/52.4 |
| 2011/0146620 A1 | 6/2011 | Kaneko | |
| 2012/0132168 A1 | 5/2012 | Kennedy | |
| 2012/0145121 A1* | 6/2012 | McCarthy et al. | 123/294 |
| 2013/0220265 A1 | 8/2013 | Hironaka et al. | |
| 2013/0239930 A1* | 9/2013 | Leone et al. | 123/51 AA |
| 2013/0319349 A1 | 12/2013 | Obrist et al. | |
| 2013/0333656 A1* | 12/2013 | Endrigo | 123/193.5 |

FOREIGN PATENT DOCUMENTS

| | | |
|---|---|---|
| DE | 2009041955 A1 | 3/2011 |
| DE | 2011101468 A1 | 11/2011 |
| FR | 2910541 A1 | 6/2008 |
| GB | 2456305 A | 7/2009 |
| JP | 56042744 A | 4/1981 |
| JP | 60045727 | 3/1985 |
| JP | 61187537 A | 8/1986 |
| JP | 63097829 | 4/1988 |
| JP | H0457636 U | 5/1992 |
| JP | 09100723 A | 4/1997 |
| JP | 4552773 B2 | 9/2010 |
| JP | 2012197680 A | 10/2012 |

OTHER PUBLICATIONS

Hassan, Elssir., "Theoretical Performance Comparison between Inline, Offset and Twin Crankshaft Internal Combustion Engines", *Proceedings of the World Congress on Engineering 2008* vol. II, London, U.K.

Haworth, D., et al., "Multidimensional Port-and-Cylinder Flow Calculations for Two- and Four-Valve-Per-Cylinder Engines: Influence of Intake Configuration on Flow Structure", SAE international Paper 900257.

Nandhivarman, V., et al, "A Cram of Reciprocating Mechanism with Offset Crankshaft Engine", *International Journal of Latest Trends in Engineering and Technology*, May 2013.

Omori, et al., "Effect of Intake Port Flow Pattern on the In-Cylinder Tumbling Air Flow", SAE International Paper 910477.

* cited by examiner

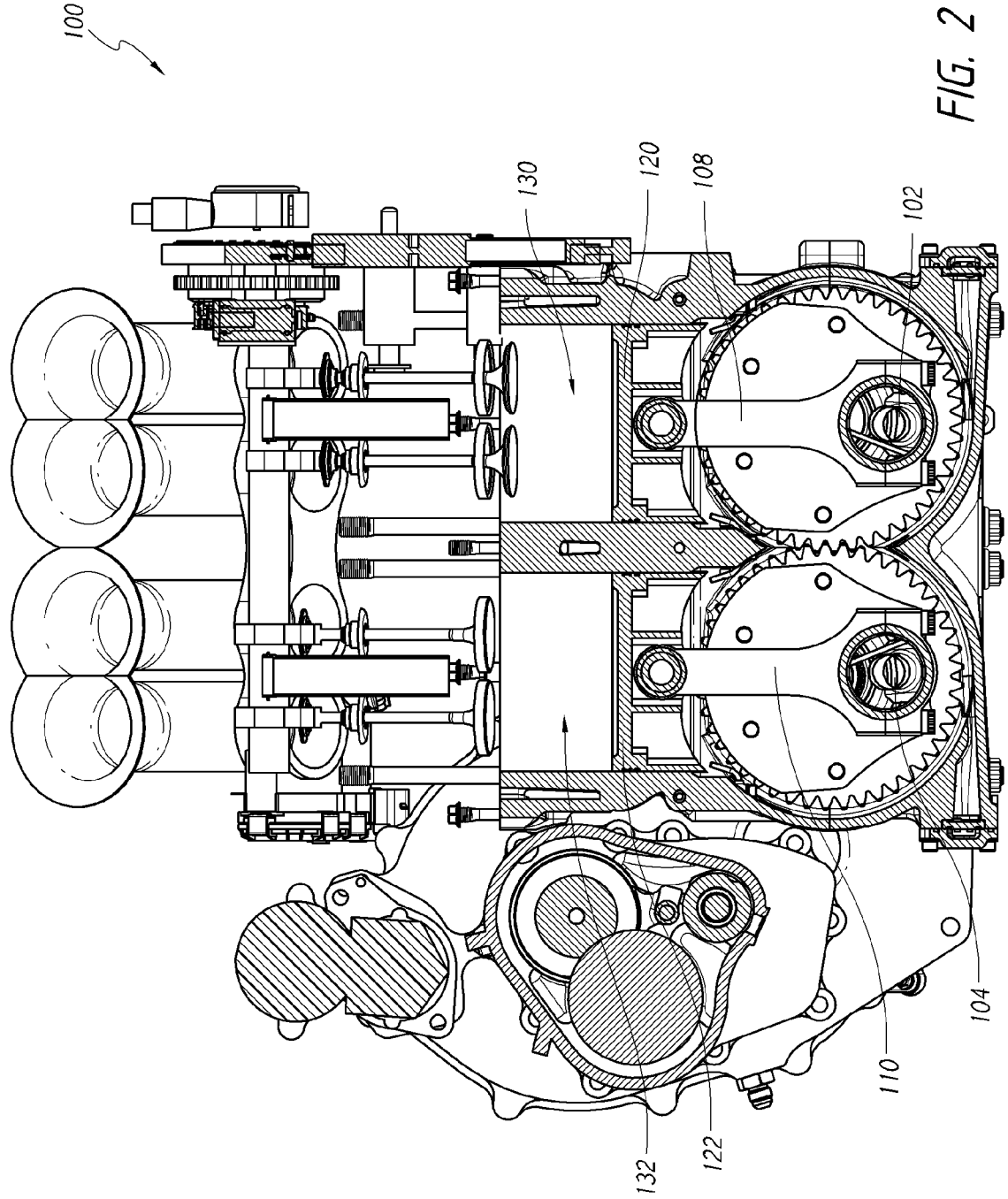

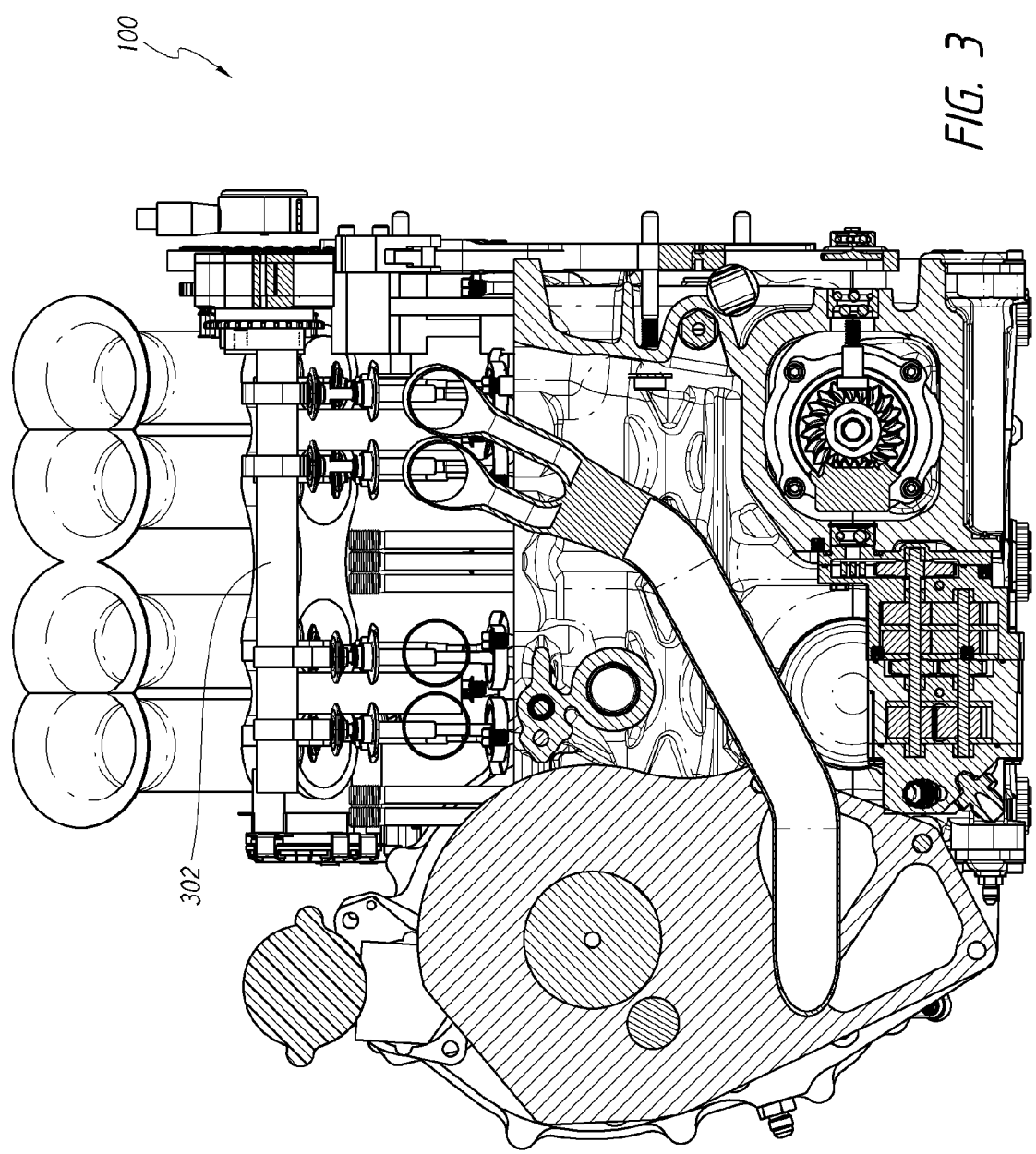

MOMENT-CANCELLING 4-STROKE ENGINE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims the benefit of U.S. Provisional Application No. 62/020,695, entitled "MOMENT-CANCELLING 4-STROKE ENGINE," filed Jul. 3, 2014, the entirety of which is incorporated herein by reference.

FIELD OF THE INVENTION

The invention relates generally to four-stroke internal combustion engines.

DESCRIPTION OF THE RELATED ART

Despite a one hundred and twenty year history of the four stroke engines, significant advancements to engine design are desired for future motorcycles, automobiles, aircraft, and/or boats. Two fundamental but persistent problems with existing engines are optimum combustion and operator-friendly operation.

Optimum combustion preferably includes consideration of power production, emissions, detonation prevention, engine efficiency, better gas mileage, engine life, engine cooling while avoiding the consequences of additional equipment, such as turbochargers, which can result in associated costs and complexity.

Operator-friendly operation preferably includes consideration of vibration, vehicle handling, engine reliability, use of available fuels, mean piston speed, endurance, engine lubrication, crankshaft torque, system simplicity, and minimized weight.

Clearly, the industry has need for a new 4-stroke engine that can optimize performance of a multiplicity of characteristics simultaneously. This disclosure describes an innovative 4-stroke engine that simultaneously provides reliability, efficiency, and low emissions in a single design.

Further, it is clear to someone skilled in the art that this design can be made applicable to a family of engines in 2-cylinder, 4-cylinder, 6-cylinder and 8-cylinder configurations. Further, based on the intended use of the engine, variants of the invention are possible.

SUMMARY OF THE INVENTION

One aspect of at least one embodiment of the invention is the recognition that it would be desirable to have an engine with improved air flow or breathing capability in a compact design that reduces vibration.

In some embodiments, including the illustrated embodiment, a four-stroke engine is disclosed. The four-stroke engine comprises a first cylinder having a first piston and a second cylinder having a second piston, a first crankshaft operably connected to the first piston and a second crankshaft operably connected to the second piston, wherein the first crankshaft rotates in a first direction and the second crankshaft rotates in a second direction. In some embodiments, the first direction is an opposite direction from the second direction. In some embodiments, the engine is water-cooled. In some embodiments, the engine has four valves. In some embodiments, the first and second pistons travel in the same plane. In some embodiments, the first and second pistons are configured with a flat head.

In some embodiments, a bore diameter of each of the first and second cylinders is between about 1.5 to 7.0 inches. In some embodiments, an oversquare ratio of the engine is greater than 1.0. In some embodiments, an oversquare ratio of the engine is greater than 1.78. In some embodiments, an engine squish is greater than 24% and less than 35%.

In some embodiments, a compression ratio of the engine is at least 9.1 to 1. In some embodiments, a compression ratio of the engine is at least 13.5 to 1. In some embodiments, a mean piston speed of the engine is less than 4200 feet per minute. In some embodiments, a mean piston speed of the engine is at least 1800 feet per minute. In some embodiments, the mean piston speed of the engine is less than 3000 feet per minute.

In some embodiments, the cylinders are displaced a nominal distance forward and aft from an intersection between the cylinders and a crankshaft axis to allow a connecting rod of each cylinder to be straighter on a firing stroke of each cylinder.

In some embodiments, the engine may further comprise a porting system comprising of at least one intake valve and at least one outlet valve per cylinder, each of the intake and exhaust valves having a valve seat angle, a valve undercut angle, and an intake port angle, wherein the valve seat angle of the at least one intake valve is between about 40-52 degrees, the valve undercut angle of the at least one intake valve is between about 30-42 degrees, the valve seat angle of the at least one exhaust valve is between about 40-52 degrees, the valve undercut angle of the at least one exhaust valve is between about 30-48 degrees, and the intake port angle is between about 45 and 65 degrees. In some embodiments, an intake valve area to a piston area is between approximately 28% and 38% when a piston diameter is between 1.5 and 7 inches and a piston stroke is between 1.5 and 3.5 inches.

In some embodiments, the engine may further comprise a third cylinder and a fourth cylinder, wherein the first and third cylinders are operably connected to the first crankshaft and the second and fourth cylinders are operably connected to the second crankshaft. In some embodiments, the engine may further comprise a fifth cylinder and a sixth cylinder, wherein the first, third, and fifth cylinders are operably connected to the first crankshaft and the second, fourth, and sixth cylinders are operably connected to the second crankshaft. In some embodiments, the engine may further comprise a seventh cylinder and an eighth cylinder, wherein the first, third, fifth, and seventh cylinders are operably connected to the first crankshaft and the second, fourth, sixth, and eighth cylinders are operably connected to the second crankshaft.

In some embodiments, the engine is mounted perpendicular to a longitudinal axis of the vehicle and the engine further comprises dual overhead cams. In some embodiments, a cross-section of a majority or all of a valve seating surface is flat or straight such that at least a majority or all of an overall shape of the valve seating surface is cone-shaped. In some embodiments, at least a majority or all of a cross-section of a valve undercut surface is flat or straight such that at least a majority or all of an overall shape of the valve undercut surface is cone-shaped.

In another embodiment, including the illustrated embodiment, a four-stroke engine is disclosed. The four-stroke engine comprises a first cylinder having a first piston, a second cylinder having a second piston, and a porting system connected to each of the first and second cylinders, the porting system comprising at least one intake port per cylinder and at least one exhaust port per cylinder, the intake and exhaust ports having a non-symmetric variable shape along a length of each port. In some embodiments, an oversquare ratio of the engine is greater than 1. In some embodiments, the engine further comprises a first crankshaft operably connected to the first piston and a second crankshaft operably connected to the second piston, wherein the first crankshaft rotates in a first direction and the second crankshaft rotates in a second direction. In some embodiments, the first and second pistons are flat head pistons. In some embodiments, the engine is water-cooled. In some embodiments, an intake valve area to a cylinder bore area is between approximately 28% and 38%, that is the intake valve area is between 28% and 38% of the cylinder bore area, when a piston diameter is between 1.5 and 7 inches. In some embodiments, a port area to a valve area is between 42% and 65%. In some embodiments, an intake port area to a valve area is approximately 53.4%. In some embodiments, an exhaust port area to a valve area is between about 72% to about 88%. In some embodiments, an intake angle of the intake port is approximately 7.9 degrees in a first direction from vertical. In some embodiments, an exhaust angle of the exhaust port is approximately 8.4 degrees in a second direction opposite to the first direction from vertical.

In another embodiment, including the illustrated embodiment, a four-stroke engine is disclosed. The four-stroke engine comprises at least one pair of cylinders, a first crankshaft operably connected to one cylinder of the at least one pair of cylinders, a second crankshaft operably connected to the other cylinder of the least one pair of cylinders, the first crankshaft configured to rotate in a first direction, the second crankshaft configured to rotate in a second direction that is opposite the first direction, and a porting system comprising two intake valves and two exhaust valves per cylinder. In some embodiments, an average piston speed is less than 4200 feet per minute. In some embodiments, a compression ratio of the engine is between 9.1 and 13.5. In some embodiments, an oversquare ratio of the engine is greater than 1.0. In some embodiments, an oversquare ratio of the engine is 1.78.

In some embodiments, the engine is configured to power a motorcycle. In some embodiments, the engine is configured to power an automobile. In some embodiments, the engine is configured to power a helicopter or other aircraft. In some embodiments, the engine is configured to power a boat.

In another embodiment, including the illustrated embodiment, an air intake system for a four-stroke combustion engine is disclosed. The air intake system comprises at least one intake valve per cylinder of the engine and a throttle valve at an entrance to the cylinder, the throttle valve configured to control air flow to the cylinder by receiving signals from an electronic engine management system, the electronic engine management system configured to transmit signals to the throttle valve such that a first position of the throttle valve corresponds to a high mileage mode of operation of the engine and a second position of the throttle valve corresponds to a high power mode of operation of the engine.

In another embodiment, including the illustrated embodiment, an internal combustion engine is disclosed. The internal combustion engine comprises a first cylinder having a first piston and a second cylinder having a second piston, a first crankshaft operably connected to the first piston and a second crankshaft operably connected to the second piston, a cylinder head comprising at least one intake port and at least one exhaust port per cylinder, each of the intake ports and the exhaust ports connected to the cylinders such that fluid can pass through the intake ports into the cylinders and fluid can pass from the cylinders through the exhaust ports, each of the intake ports further comprising an intake valve configured to control the flow of fluid through the intake ports, each of the exhaust ports further comprising an exhaust valve configured to control the flow of fluid through the exhaust ports, the intake ports and the exhaust ports having a non-symmetric variable shape along a length of each port such that a valve seat angle of each of the intake valves is between about 40-52 degrees, a valve undercut angle of each of the intake valves is between about 30-42 degrees, a valve seat angle of each of the exhaust valves is between about 40-52 degrees, a valve undercut angle of each of the exhaust valves is between about 30-48 degrees, and an intake port angle of each of the intake valves and exhaust valves is between about 45 and 65 degrees, wherein the first crankshaft rotates in a first direction and the second crankshaft rotates in a second direction such that the second direction is an opposite direction from the first direction. In some embodiments, a bore of each of the first and second cylinders is greater than 3.0 inches. In some embodiments, an oversquare ratio of the engine is greater than 1.0. In some embodiments, each of the first and second pistons are flat top pistons and a squish area of each piston is between 24%-35% of an area of the piston.

BRIEF DESCRIPTION OF THE DRAWINGS

FIG. 2: Cross-sectional View of Moment Canceling Engine through Center of Pistons FIG. 3: Cross-section View of Moment Canceling Engine through Right Side

DETAILED DESCRIPTION OF THE PREFERRED EMBODIMENT

The following detailed description is directed to certain specific embodiments of the invention. However, the invention may be embodied in a multitude of different ways as defined and covered by the claims.

In the following description, numerous aspects of the engine provide advantages over prior engine designs. References to certain aspects as important or significant does not imply that each and every one of the referenced aspects are required in all embodiments of the invention to provide advantages over the prior art.

In the illustrated embodiment, the water-cooled Moment-Cancelling 4-Stroke Engine (MC4S) has twin vertical cylinders with aluminum alloy crankcase, cylinder, and head casting. The twin cylinders' crankshafts are preferably orientated to be transverse and, preferably, perpendicular to the longitudinal axis of the vehicle, such as a motorcycle. In the preferred embodiment, the cylinders are displaced a nominal distance forward and aft from their normal intersection with the crankshaft axis allowing the connecting rod to run straighter on the firing stroke. In one embodiment, the sump is one piece cast aluminum alloy. The cylinder bore is preferably liner-less and has a Nikasil (Trade Name for electrodeposited lipophilic nickel matrix silicon carbide) coating for wear resistance. In some embodiments, the head is attached to the crankcase and sump by seven through bolts. Head sealing is preferably accomplished with custom-designed gaskets of multi-layered steel, such as those provided by Cometic Gasket Company.

Figure 1A:
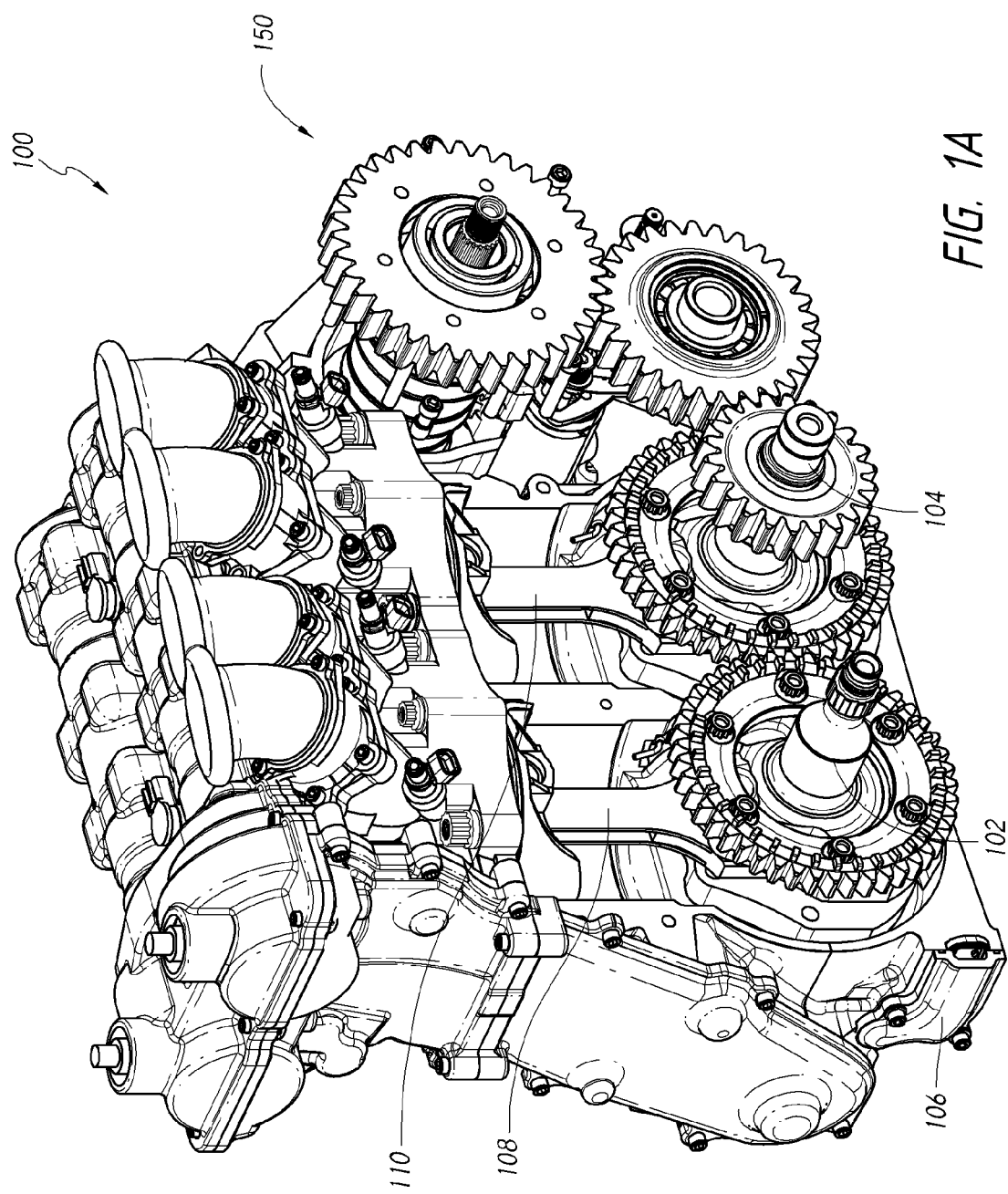
FIG. 1A: Isometric View of Moment Canceling Engine
Figure 1B:
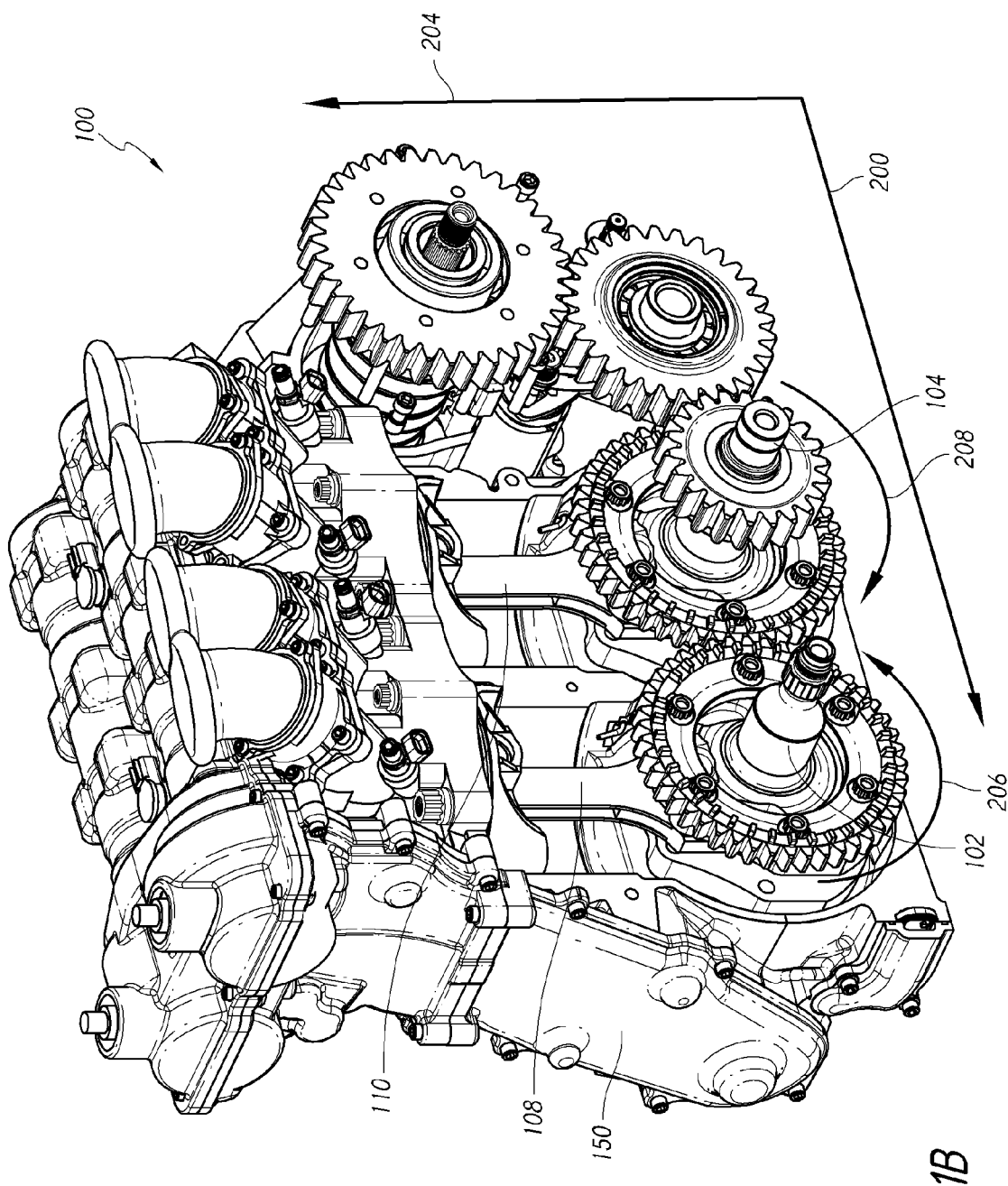
FIG. 1B: Isometric View of Moment Canceling Engine Indicating Several Axes of the Engine
Figure 1D:
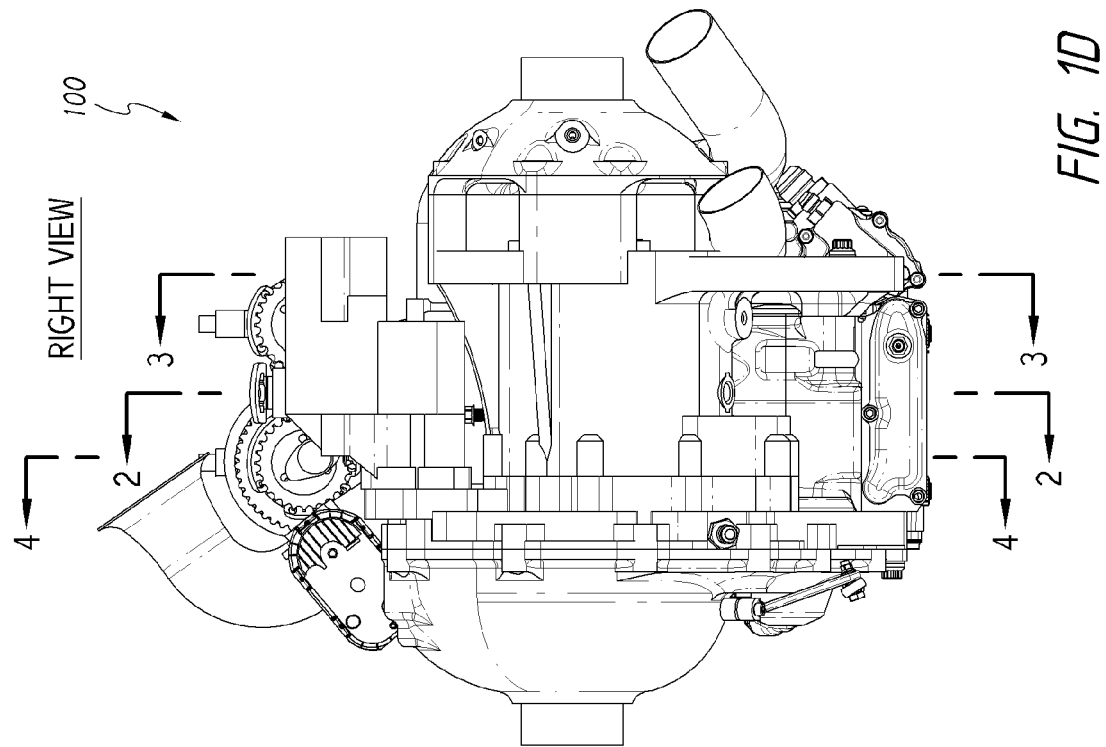
FIG. 1D: View of Right Side of Moment Canceling Engine
Figure 1C:
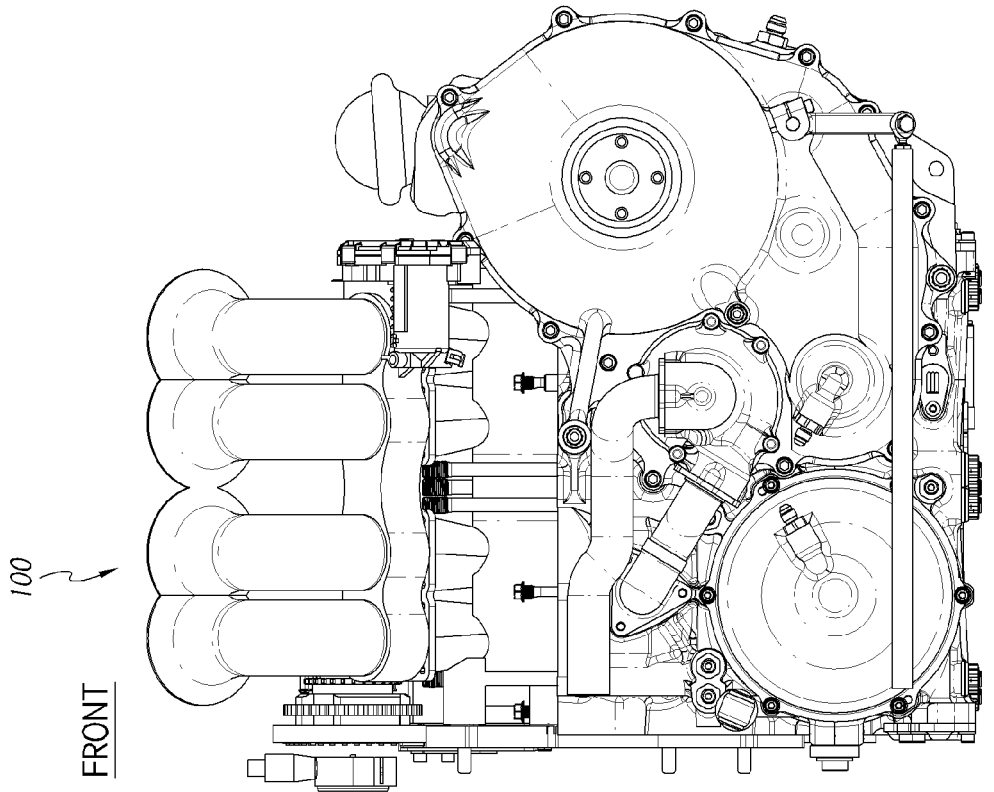
FIG. 1C: View of Front Side of Moment Canceling Engine

FIGS. 1A and B show an isometric view of the MC4S engine. Shown are the crankcase, cylinders, head casting, sump 106, and head bolts. Additionally, crankshafts 102, 104 are connected to the pistons via the piston rods 108, 110. A gearing system 150 connects the crankshafts 102, 104 to the transmission of the vehicle. FIG. 1B illustrates the orientation of the engine 100 relative to the longitudinal axis 200 of the vehicle. The engine 100 is desirably oriented such that the cylinders and by extension, the piston rods 108, 110 connected to the piston within the cylinders, are in line with the longitudinal axis 200. The cylinder bore axis 204, an axis defining the vertical dimension of the cylinder oriented in the direction of travel of the piston within the cylinder, is desirably orthogonal to the longitudinal axis 200 of the vehicle. Desirably, the crankshafts 102, 104 rotate in opposite directions (one crankshaft 102 rotates counter-clockwise, the other crankshaft 104 rotates clockwise), as indicated by arrows 206, 208. The counter-rotating crankshafts 102, 104 preferably improve the balance of the engine 100, as will be described in further detail below. FIGS. 1C-D illustrate other views of the engine 100. FIG. 1C illustrates a front view of the engine 100. FIG. 1D illustrates a right side view of the engine 100 to indicate the cross-sections shown in FIGS. 2-4.

Figure 4:
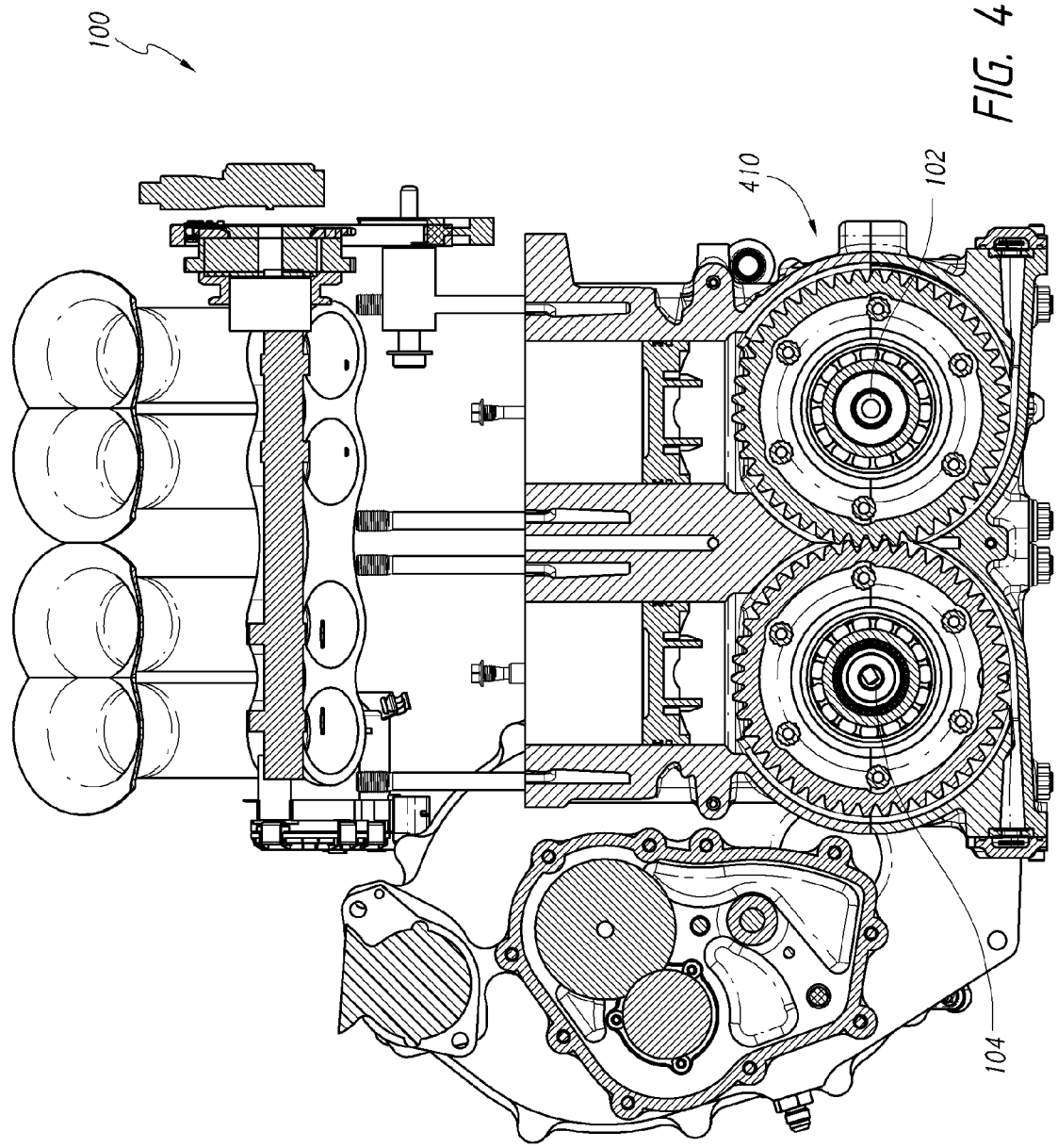
FIG. 4: Cross-sectional View of the Moment Cancelling Engine through the Left Side
Figure 5:
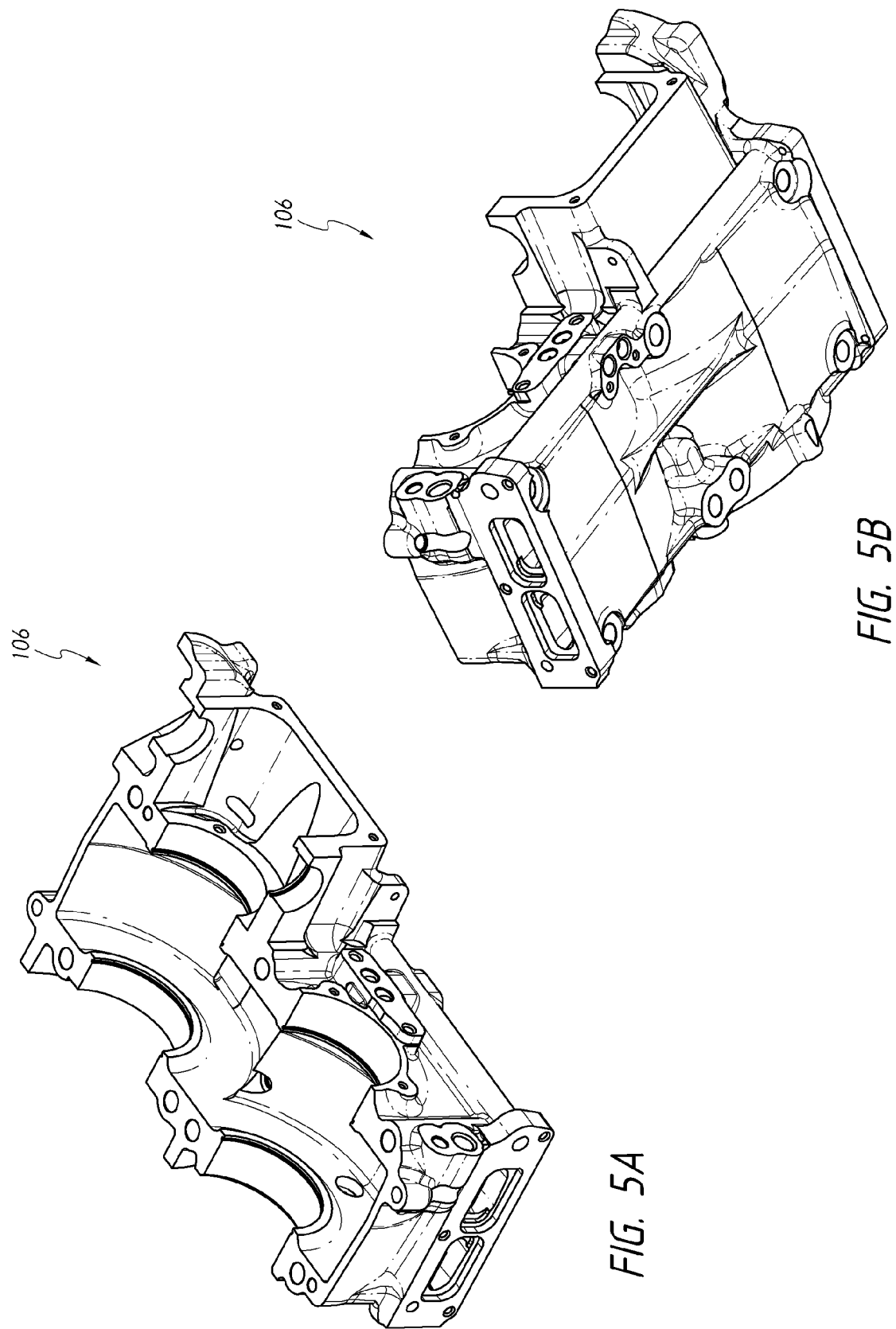
FIG. 5A: Isometric View of Moment Canceling Engine Sump
FIG. 5B: Second Isometric View of Moment Canceling Engine Sump

FIG. 2 shows a cross-section though the center of the MC4S engine 100 allowing a view of the pistons 120, 122; piston rods 108, 110; cylinders 130, 132; crankshafts 102, 104; and crankshaft gears. FIG. 3 shows a cross-sectional view of the MC4S engine 100 through the right side of the engine showing the oil pump, timing chain, cam shaft 302, exhaust, and transmission. FIG. 4 shows a cross-sectional view of the MC4S engine of the left side of the engine showing the end of the crankshafts 102, 104 and attached crankshaft gears and bearing 410. FIGS. 5A and B show an isometric view of the oil sump 106 for the MC4S engine 100.

Moment Cancelling 4-Stroke Engine Features

The MC4S engine assembly makes use of a large bore diameter (in some embodiments, ranging from 1.5-7.0 inches) flat top piston with a relatively short stroke of preferably 1.5-5.0 inches. The configuration of one preferred embodiment includes a 5.0 inch bore diameter with 2.8 inch stroke. Specifically, the MC4S engine is preferably designed to have a bore diameter greater than the stroke length, called "oversquare." In one embodiment, the MC4S is "oversquare" with a ratio of 1.78. Someone skilled in the art would understand that in other embodiments the MC4S could be built with a range of "over square" ratios from 1.1-4.5.

The MC4S engine is preferably designed with a specific amount of "squish", which is the inward movement of air towards the center as the piston approaches Top-Dead-Center of its stroke. The objective of this design feature is to bring the largest possible amount of the air into contact with the fuel during combustion. In some embodiments, for the flat top piston configuration, the squish area can range from 24%-35% of the area of the piston. In a preferred embodiment, the squish area is approximately 31.5% or between 28%-33% of the piston area. This range of squish area significantly helps prevent the issue of detonation in the combustion chamber. This is another example of the delicate inter-relationship of multiple design features in an optimum configuration of the preferred embodiment, specifically the piston stroke in combination with the supply of air to the engine.

In a preferred embodiment, the engine has a mean piston speed of less than 4200 feet per minute. Empirical observation from a number of proprietary race engines has shown that engine reliability is generally greatest with a mean piston speed of 1800-5200. Further empirical observation has shown that piston engines for aircraft, such as helicopters, with a mean piston speed of 1800-1900 feet generally have high reliability and that engines with over 5200 feet per minute may be prone to prematurely-shortened operational life.

Figure 6:
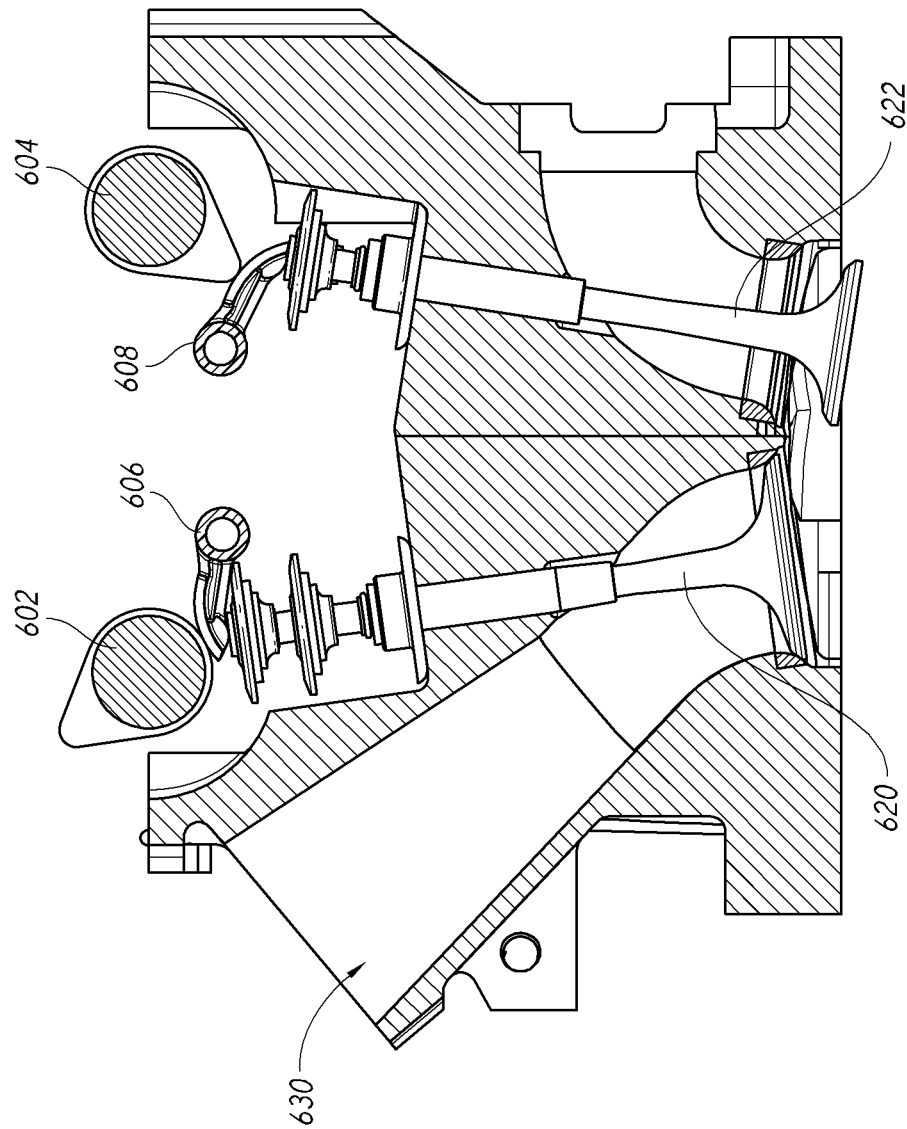
FIG. 6: Cross-sectional View of Moment Canceling Engine Valve Train Layout

FIG. 6 shows the Valve Train layout of the MC4S engine 100. Shown in cross-section are the dual camshafts 602, 604, intake valve 620, exhaust valve 622, cam followers 606, 608, and intake porting 630. Each cylinder preferably has a single spark plug. The cam shafts 602, 604 are preferably chain driven off of the right end of the forward crankshaft. The cam followers 606, 608 are preferably made of forged carbon steel. The cam shafts 602, 604 are specifically designed in conjunction with the porting configuration to provide an abundance of air to the cylinder. The cam shafts 602, 604 are typically made of billet or forged steel. The cams 602, 604 are desirably equipped with variable valve timing controlled by the Engine Control Unit (ECU).

Use of the large diameter cylinder and relatively short stroke (oversquare configuration), in combination with the improved porting system, produces multiple benefits. These benefits include high power output and long engine life with relatively low mean piston speed, associated higher reliability, and reduced manufacturing costs.

Moment-Cancelling 4 Stroke Engine Porting

The MC4S engine porting has features that include intake and exhaust valve configurations and intake porting that preferably result in a significant engine performance enhancement as the result of improved delivery of air into the combustion chamber. Experiments have shown that the careful matching of air movement shown herein along with fuel distribution can have a dramatic effect on engine performance.

In some embodiments, the double tapered intake port preferably has a curved transition on the longer side of port to help offset the air volume of valve stem, as shown in FIG. 6. In addition, on the short side of the port, the radius of the port transition preferably expands slightly to meet the valve seat. These "pigeon toe ports" (converging ports) enhance the burning of extra lean mixtures and significantly improve combustion.

The valves 620, 622 may be made of various materials including various temperature resistant steels as well as Titanium, and ceramics. In the head, the valve seat can be made of various materials including copper-beryllium, bronze, steel, or ceramics.

Figure 7:
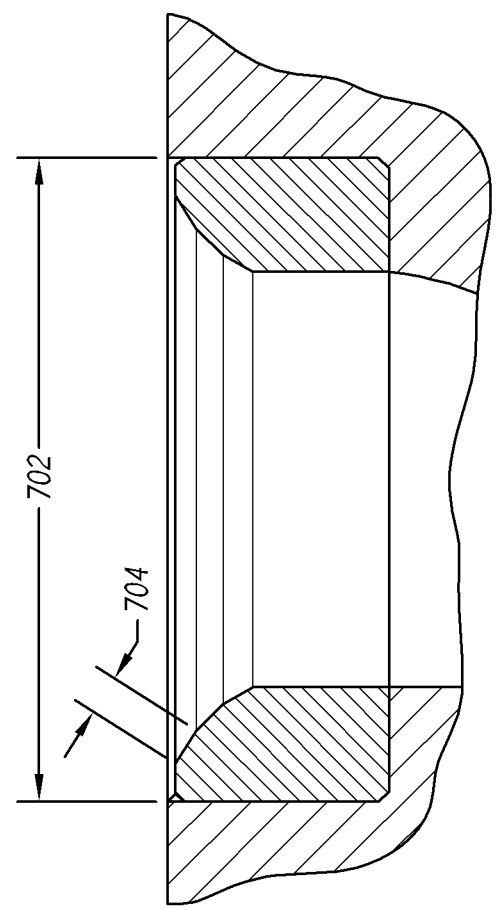
FIG. 7: Detail Cross-sectional View of Intake Valve and Cylinder Head

FIG. 7 shows a cross-section of the intake valve in close proximity to the head. The valve diameter 702 is the diameter of the radially outer most edge of the surface defining the valve seat along a cross-section perpendicular to the axis of movement of the valve. The valve seat width 704 is the length of the surface extending from the radially outermost edge of the valve seat surface to the radially innermost edge of the valve seat surface.

Experiments and analyses have shown that small changes in intake and exhaust valve angles can have significant effects on engine performance. Over 200 variations of valve configurations have shown that the preferred embodiment as illustrated can result in a 15% increase in the volume of air (cubic feet/minute) delivered at high velocities (0.5-0.95 Mach). In comparison, normally-aspirated engines have intake velocities less than 0.4 Mach and the associated less volume of air.

Another significant design feature of the illustrated engine is the relationship of intake valve area (sq. in.) to bore area (sq.in.). This relationship can affect the "breathing" of the engine by providing greater delivery of air into the chamber with the physical constraints of the bore size. For example, for the dual intake valve and dual exhaust valves for the flat head piston engine shown, the range of the combined area of the two intake valves is preferably 28-38% of the bore for pistons of 1.5 inch to 7 inch range and engine strokes of 1.5-3.5 inches.

A similar relationship of exhaust valve area (sq. in.) to bore diameter has a preferred range of 14-20% and for bores of 1.5-7.0 inches and engine strokes of 1.5-5.

Another significant design feature is the relationship of the port area to the valve area. For the MC4S engine, the intake port area to valve area has a range of 42-65% of the valve area with the preferred embodiment of 53.4%.

Another significant design feature of the illustrated engine 100 is the angle of the intake and exit port angle. The intake port angle is preferably about 7.9 degrees left of vertical and the exhaust port angle is preferably about 8.4 degrees right of vertical for an inclusive angle of about 16.6 degrees.

The MC4S engine 100 also expands the operating envelop of the Otto cycle. Because of the increased air mass delivered into the piston, the overall engine work capacity is increased. See the Otto cycle illustration shown below in FIG. 8.

Figure 8:
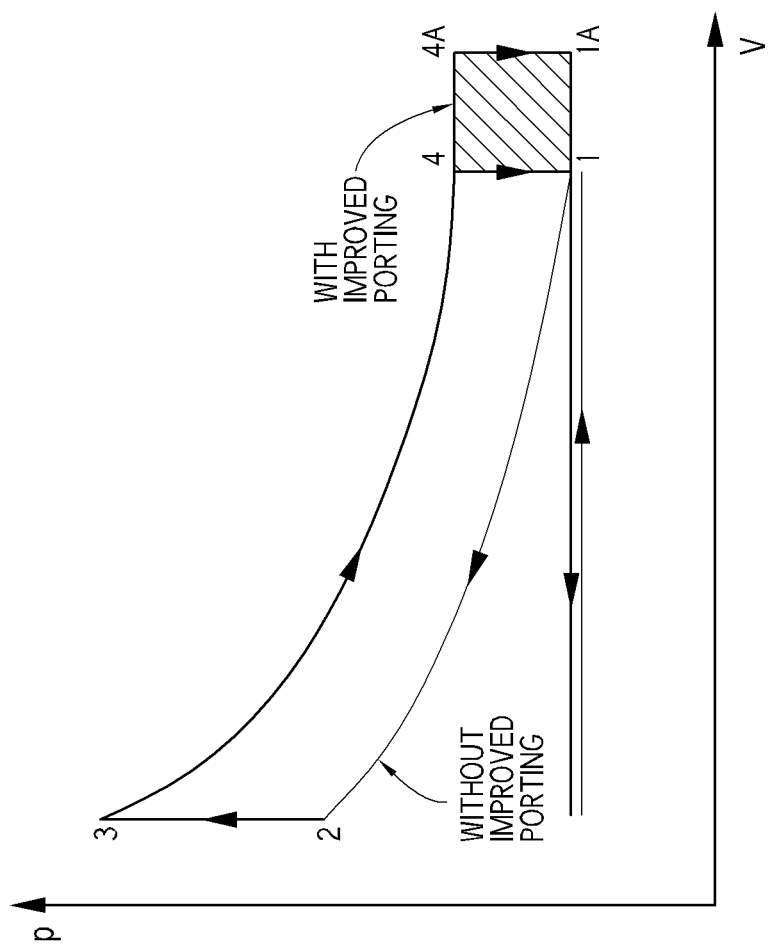
FIG. 8: Otto Cycle Illustration

Another example of the benefits of the described MC4S porting system is manifest in increases in power from the engine. FIG. 8 illustrates an Otto cycle for an engine with and without the improved porting disclosed herein. Specifically, using the MC4S engine without the MC4S porting system, the engine generally produces a maximum of about 141 hp. However, with the MC4S porting system the same engine produces about 262 hp, or an 85% increase in power, as illustrated by the shaded area in FIG. 8. This dramatic difference is the result of delivering the air deeply and efficiently into the bore and producing an efficient combustion process.

In addition, the intake system may be equipped with a throttle valve at its entrance. Engine Management electronics may optionally control the throttle valve into multiple positions. With the Engine Management controlling the variable cam timing and "throttle-by-wire" via the throttle valve, the engine may operate in a "high mileage" mode that may provide good fuel mileage and adequate power and a "Sporty mode" that provides greater engine power.

It can be seen by someone skilled in the art that the above combination of features (port shape and angles, valve shape-seat shape, valve area to piston area) are inter-related to provide optimum delivery of air to the engine with the associated benefits of better combustion efficiency, greater power, and higher engine torque, which in combination with control over squish, compression ratio, piston stroke, and piston size preferably results in an engine optimized for multiple parameters. For example, the lower compression ratio reduces the potential for detonation. In another example, a more efficient flow through the ports results in less lift required of the valves, which results in less spring load required for the valves, which results in less wear on the camshafts. In yet another example, the combination of lower compression ratio and better delivery of air flow allows the use of conventional fuels that burn with less NOx and COx emissions.

When the above described porting system is combined with an Engine Control Unit (ECU), the result is significantly lower NO and CO gases because of the additional availability to air for combustion.

Crankshaft Features

Figure 9:
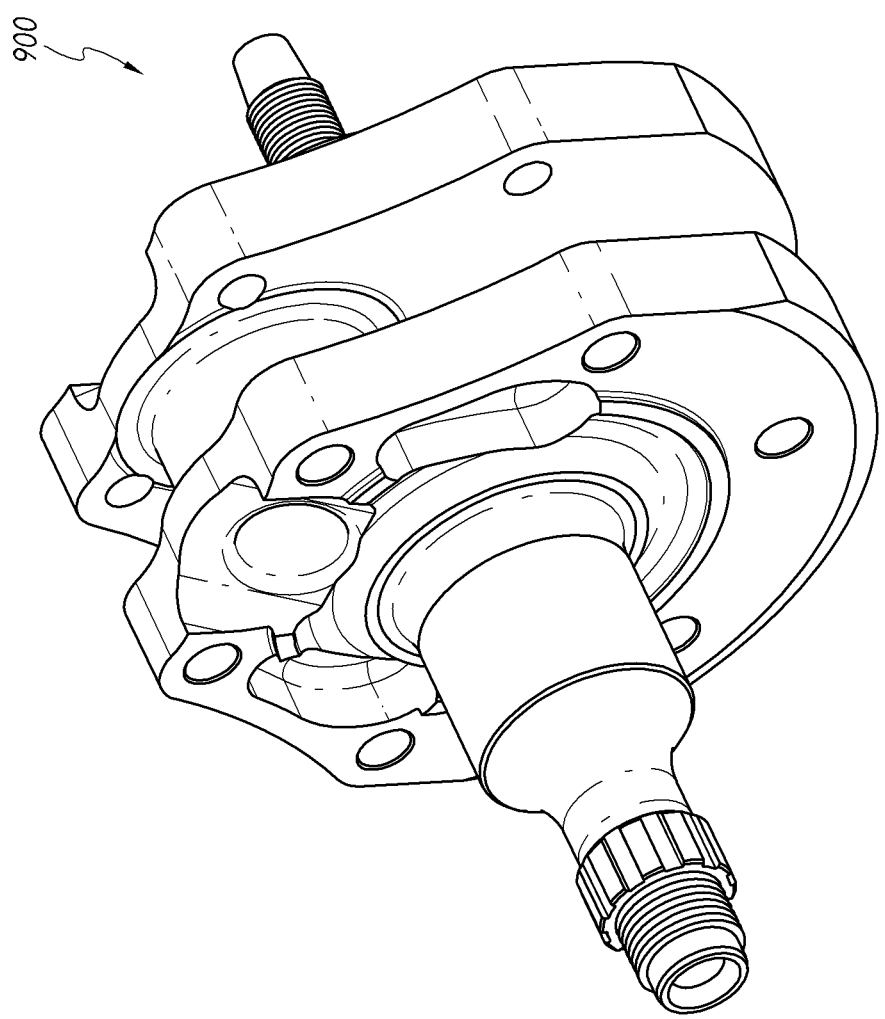
FIG. 9: Isometric View of Crankshaft for the Moment-Cancelling 4. Stroke Engine

The design of the crankshaft for the MC4S engine has several unique aspects. FIG. 9 shows an isometric view of one of the crankshafts 900 of the MC4S engine.

The two crankshafts for the two pistons are preferably mounted perpendicular to the longitudinal axis of the vehicle, such as on a motorcycle, and are designed to rotate in opposite directions. When the MC4S engine is operating, the rotational moments created by the crankshafts preferably cancel each other (Moment-Cancelling), which prevent a common problem with crankshafts parallel to the axis of the vehicle, that is, greater difficulty and effort in turning in one direction than the other due to the gyroscopic effect.

In the four-stroke MC4S engine illustrated herein, the two crankshafts are preferably synchronized by meshing a gear on each crankshaft, thereby determining the timing of the pistons to each other.

Another significant benefit of the two crankshafts rotating in opposite direction in the MC4S engine is the reduction in transverse motion imparted to the vehicle as a result of cancelling the horizontal imbalance. During any 4-stroke cycle, both vertical and horizontal forces are placed on the bore by the rotation of the connecting rods and transmitted to the crankshaft. In many conventional engines, this imbalance is manifested as a forward and backward rocking motion in a motorcycle with an engine without a rotating balancing crankshaft. However, in the MC4S, this motion is preferably cancelled within the motor, again resulting in a low vibration engine.

Another benefit of the moment cancelling crankshafts is simplicity. Specifically, in some 4-stroke engines with a single crankshaft, rotating balance shafts are incorporated to reduce vibration, thus adding costs and complexity and not preventing the problems but only ameliorating them. The presented MC4S engine desirably circumvents this complexity.

Other important benefits of reduced engine vibration are improved bearing life, increased simplicity through the prevention of use of vibration dampers, and reduction in stresses in the motor and on the vehicle.

As shown in FIG. 1B, the crankshafts use gears and a chain as part of a chain drive system 150 to drive the camshafts. As a result of the smooth operation of the crankshafts, the camshafts preferably see less vibration, desirably resulting in long operational life of the connected component.

Another important feature of the crankshaft 900 for the MC4S engine is its extremely short length for a two cylinder engine. Because the crankshaft design for two cylinders is equivalent in length to a single crankshaft, the relatively short length adds to the rigidity (hence resistance to bending) of the assembly. When placed in combination with modern ball-bearings, the result is desirably minimum bending-induced vibration and longer bearing life.

The crankshaft 900 can be made of various materials but typically it is made from high strength alloy steels; however, other materials may be used including Titanium alloys. In some embodiments, various coating and hardening processes may be applied to the crankshaft including nitriding steel to enhance wear characteristics.

Bearing loads were calculated at numerous positions during the rotational cycle from which the lubrication scheme was developed. Again, because of reduced vibration, bearing life is desirably improved because the fluid bearing is not periodically collapsed.

In addition, the smooth motion of the moment-cancelling crankshafts of the MC4S engine desirably helps prevent the superposition of vibratory accelerations on the valve train, thereby again increasing operating life.

In some embodiments, the crankshafts feature heavy duty splines and gears that facilitate driving other engine elements efficiently. The right end of the forward crankshaft 102 (FIG. 1B) is used to drive the oil pump and via chain drive to the cam shafts. The left side rear crankshaft 104 drives a gear, then through an idler gear to the transmission and ultimately to the power train and the left forward crankshaft 102 drives the alternator.

The design and orientation of the crankshafts for the MC4S engine desirably results in the benefits of ease in turning the vehicle and reduction in engine vibration in multiple locations with associated greater reliability and lower operating cost, as well as a compact engine layout.

Reliability Features of Moment-Cancelling 4 Stroke Engine

As has been discussed above, a combination of features is preferably incorporated into the MC4S engine to increase the reliability of the engine. For example, limiting the mean piston speed through the combination of short piston stroke and operational engine speed (rpm) preferably results in longer engine life. Incorporation of the moment-cancelling crankshafts preferably produces the benefits of low vibration, reduced potential valve and camshaft excessive vibration and induced wear, lower intake and exhaust valve stresses, lower valve spring loads, longer cam life, and increased life of the structural features of the vehicle.

Again, because of the crankshaft configuration, a short, nearly rigid load structure resistant to bending during combustion preferably increases the operational life of the crankshaft bearings.

Use of the large diameter piston with short stroke preferably results in adequate power without the complexity of additional pistons (for the same amount of power) and thus desirably substantially reduces complexity and the probability of problems.

Use of the large diameter pistons with short stroke and the highly efficient porting system described, along with the use of conventional fuels, desirably allows for a lower compression ratio for the same power with detonation avoidance and therefore higher reliability.

Again, the combination of the unique porting system and piston size preferably easily produces significant power without excessive loading of the system and thereby increases engine life. Further, the porting system desirably allows greater air supply and ultimate greater power.

Because of the moment-cancelling crankshafts and the resulting smooth operation, gear life is desirably extended.

Because of the compact layout of the engine in combination with the power generated, the localized heated areas of the engine are desirably easily controlled by the liquid cooling system, again increasing reliability.

The use of coating on the bore desirably allows better heat transfer to the cooling system as the use of oil to cool the undersides of the pistons desirably reduces heat and increases engine life.

Performance-Enhancing Modifications to the Moment-Cancelling Four Stroke Engine

Another significant advancement of the MC4S engine 100 is the ease in which performance parameters can be enhanced. By increasing the valve acceleration rate and rpm (and hence the mean piston speed), even greater power is desirably available. For example, for an MC4S engine as illustrated herein without the MC4S porting system and with a mean piston speed less than 4200 feet per minute, the power is about 189 hp. For an MC4S engine as illustrated herein having the MC4S porting system and a mean piston speed of 4200 feet per minute, the power is about 262 hp. The use of the MC4S porting system desirably increases engine power by 38%. For the MC4S engine with the MC4S porting system and a mean piston speed above 4200 feet per minute, the power output is desirably a remarkable 303 hp. Use of the MC4S porting system and higher piston speed desirably result in a power increase of over 60%. This provides a quantified example of the inter-relationship of the several design features listed.

Variations of the Moment-Cancelling 4 Stroke Engine

The Moment-Cancelling 4 Stroke Engine has multiple variants that are included within this invention. Specifically, the MC4S Engine can be in a 2-cylinder (twin), 4-cylinder (quad), 6-cylinder, and 8-cylinder configurations.

Benefits

Improved Air Intake: Significantly improved air flow allows the engine to have a more complete combustion, greater engine efficiency, greater power, lower emissions.

Moment-Cancelling Crankshafts: Reduces the rotational moment of from the crankshafts allows easier turning of the vehicle (motorcycle) and less vibration.

Offset cylinder: The offset of cylinders allows the connecting rod to run straighter during the firing stroke. The result of this is faster acceleration with less side force on the piston skirt.

Moment-Cancelling Crankshaft: reduces engine vibration and thereby decreases wear and increases overall engine and vehicle life Improve Air Intake: Greater air flow allows wide range of compression ratios and when compression ratios are reduced the endurance of the engine is increased and the probability of detonation decreased.

Unexpected Results from MC4S Engine

The MC4S engine's preferable performance criteria are the following: (1) sporty engine power, using commercially available fuels, with reduced danger of piston detonation; (2) abundant air intake without the necessity of turbocharger; (3) long engine endurance life without sacrificing sporty power and torque; and (4) good fuel economy.

One method of achieving these objectives lies in the design of the air intake and exhaust system for the engine. A large number of experiments and simulations were conducted on the MC4S Engine for the purpose of isolating these characteristics and combination of characteristics to improve performance.

Several intake-exhaust system and engine parameters were used to evaluate the performance objectives. These include Brake Mean Effective Pressure (BMEP) in the cylinder.

BMEP is a quantity relating to the operation of a reciprocating engine and is a valuable measure of the engine's capacity for work and power. For example, a naturally aspirate engine has a BMEP of 125-150 lbs/in$^2$. It can be thought of as the "average" piston pressure during the stroke.

Another parameter is the air flow (CFM) into the cylinder, measured in cubic feet per minute. This parameter provides an indication of the amount of air available into the cylinder for combustion. Because this is a dynamic process of the lifting of the valve, the air flow can be related to the amount of lift displacement of the valve.

Another parameter used in characterizing engines is its compression ratio (CR). The CR is the ratio of the volume of the combustion chamber from its largest capacity to its smallest capacity, that is when the volume of the cylinder when the piston is at its lowest position (bottom dead center) versus the volume of the cylinder when the piston is at its highest position (top dead center).

As a result of extensive experiments, other characteristics important to the air intake system were discovered. Specifically, the intake short side radius was found to be of importance in the mixing of the air-fuel. Also, the intake valve backside radius was also found to be of importance.

The following presents some of the extensive data generated for the MC4S engine and reviews several unexpected results that demonstrate that the design objectives achieved were significantly greater than anticipated with existing knowledge. Parameter ranges that produce the above-mentioned unexpected results are discussed.

Figure 10:
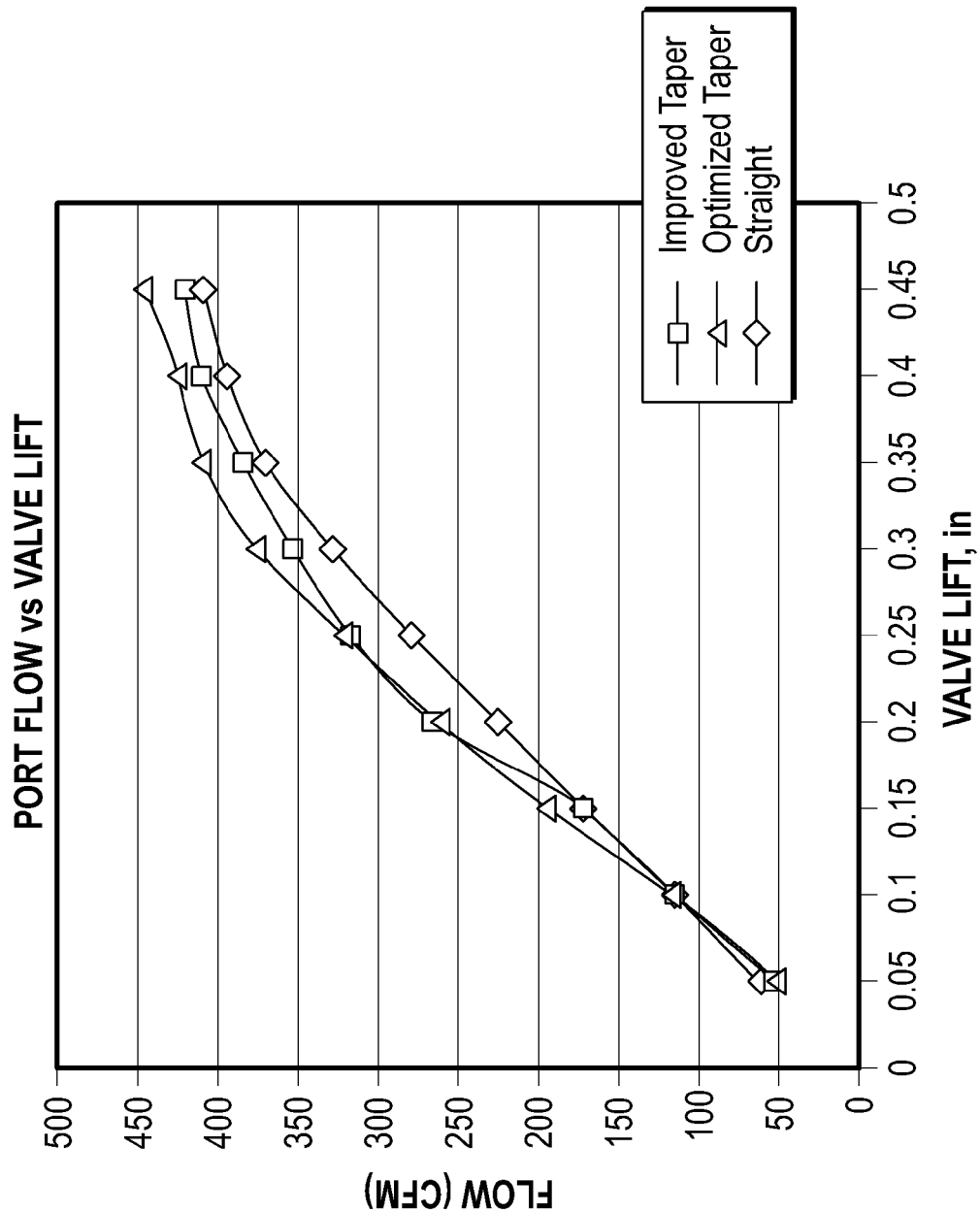
FIG. 10: Inlet Flow versus Valve Lift for Several Configurations of Inlet Ports for MC4S Engine

Effects and Significance of Inlet Port Taper on Pressure (BMEP) in the Cylinders of MC4S Engine For the MC4S engine's intake system, several design variations were created that examined the amount of flow into the cylinder. FIG. 10 shows three of these intake port variations—STRAIGHT intake port, IMPROVED TAPERED port, and OPTIMIZED tapered—for various amounts of valve lift, allowing a comparison of the performance of each port configuration.

FIG. 10 reveals several unexpected results. First, the area under these curves is an indicator of the amount of useful air for combustion. Therefore, both the IMPROVED TAPER port and the OPTIMIZED TAPER port provide a greater amount of air available for combustion and hence greater work per stoke of the piston, with the OPTIMIZED TAPER port providing the greatest amount of air and hence greater work per stoke of the three configurations. The significantly greater area under the flow versus valve lift (air volume) line for the OPTIMIZED TAPER configuration is unexpected. The OPTIMIZED TAPER configuration provides a consistently greater volume of air than the baseline STRAIGHT TAPER configuration or the IMPROVED TAPER configuration or any of the hundreds of other configurations evaluated.

Figure 11A:
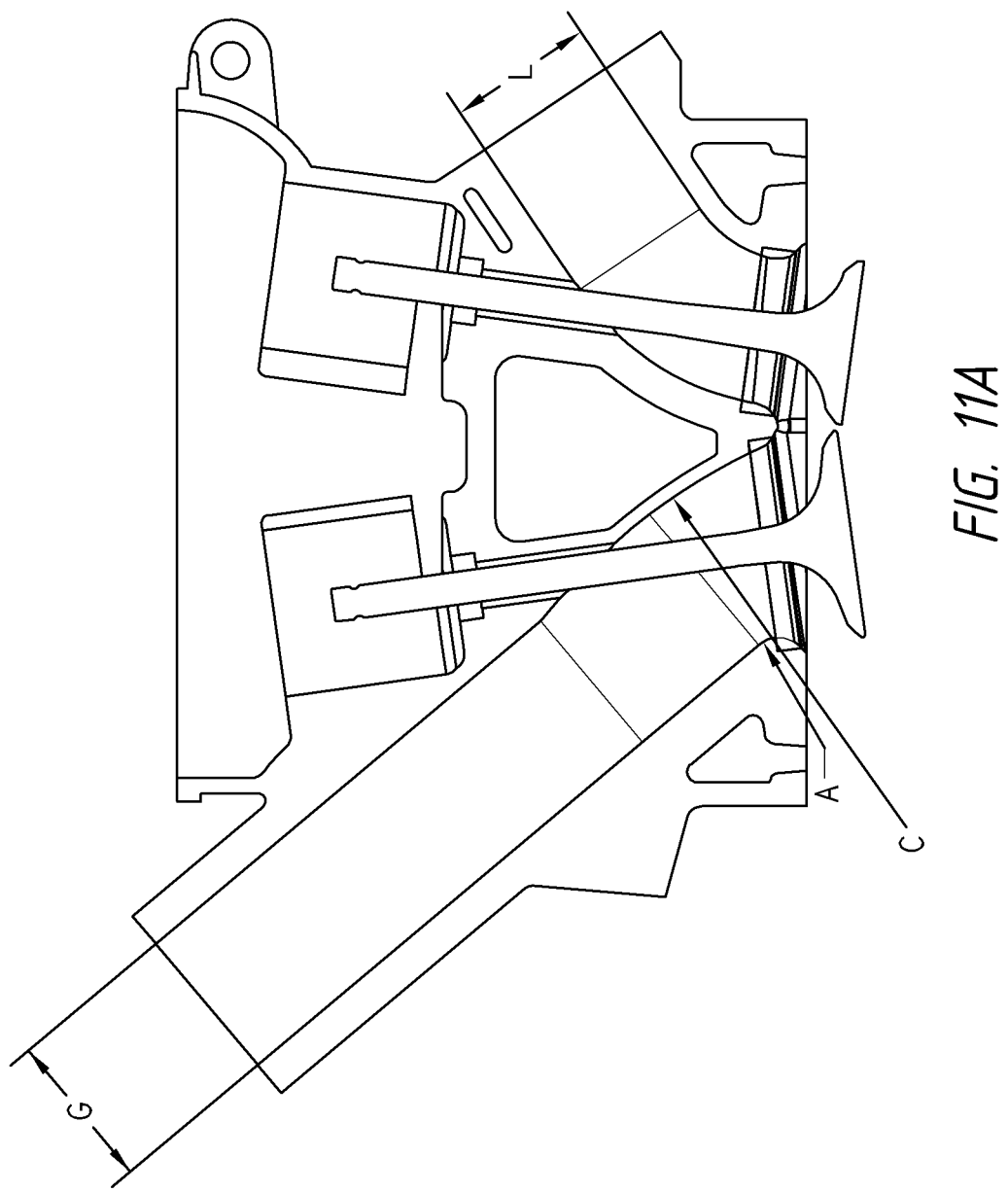
FIG. 11A: STRAIGHT TAPER Intake Porting System
Figure 11B:
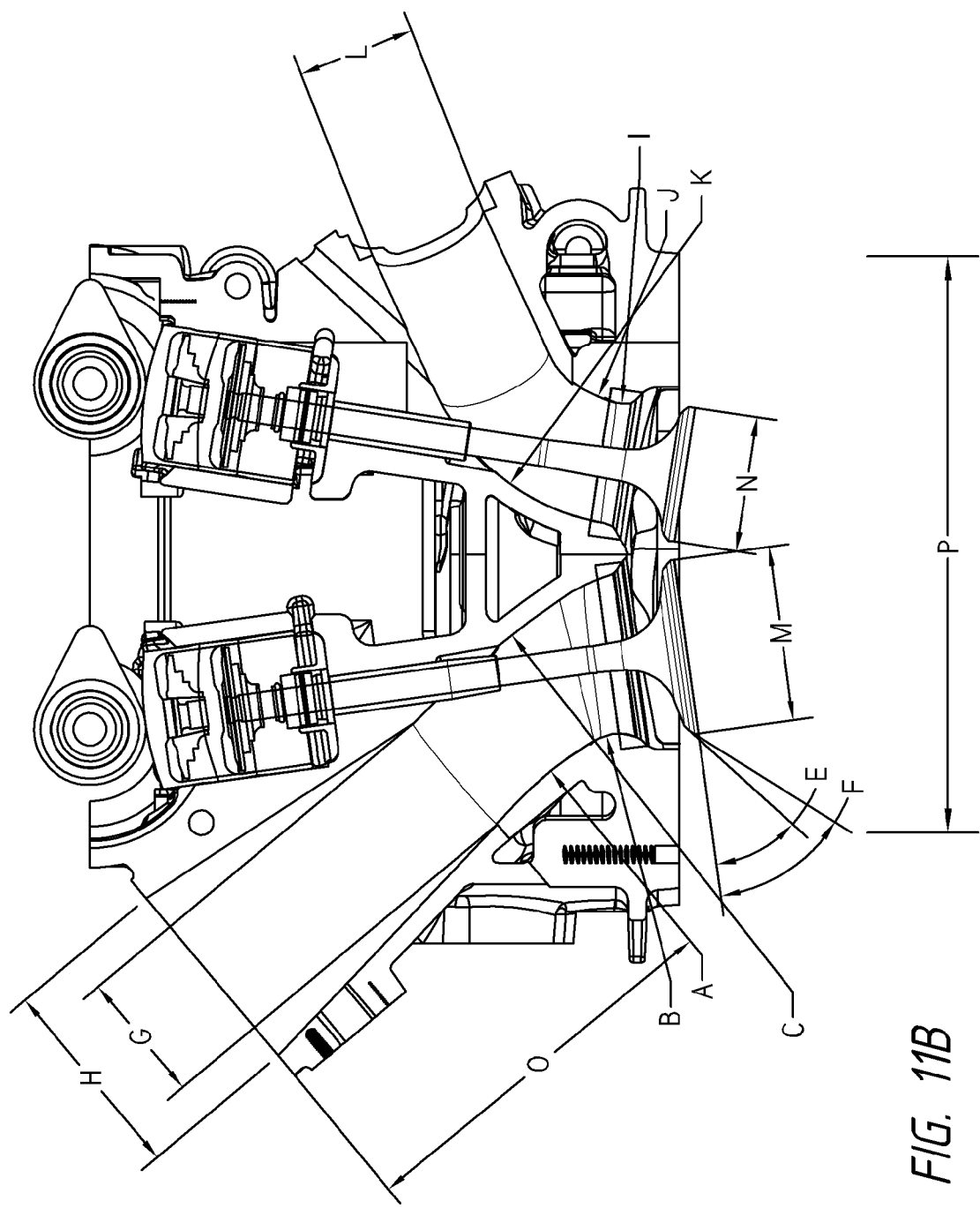
FIG. 11B: IMPROVED TAPER Porting System
Figure 11C:
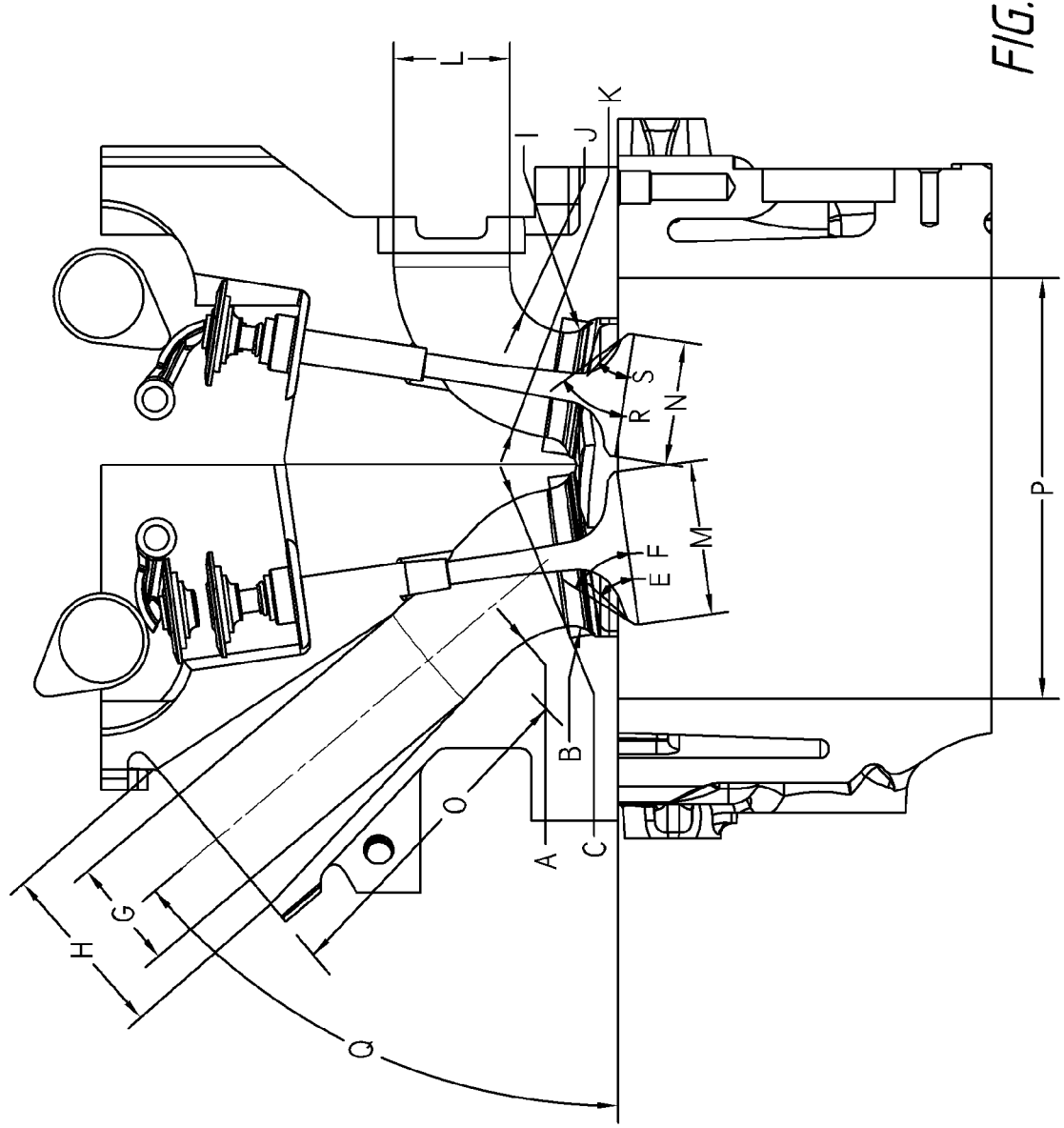
FIG. 11C: OPTIMIZED TAPER Porting System

To illustrate the physical differences in the porting system that produced these unexpected results, FIGS. 11A, 11B, and 11C are included. In FIG. 11A, the dimensions of an existing intake system are shown for a 5 inch diameter cylinder configuration. This configuration produced the STRAIGHT TAPER Port Flow versus Valve lift data shown in FIG. 10. Similarly, FIG. 11B shows the physical dimensions of the IMPROVED TAPER configuration that produced the IMPROVED TAPER data shown in FIG. 10 for a 5 inch cylinder bore. FIG. 11C shows the physical dimensions of the OPTIMIZED TAPER configuration that produced the OPTIMIZED TAPER data shown in FIG. 10, again for a 5 inch diameter cylinder. It is clear to someone expert in the art that FIG. 11C is one embodiment of this invention and that for engines with greater or lesser cylinder displacement, the actual dimensions would change proportionately; however, important relationships between features and performance are affected by the range of the cylinder bore diameter.

At first review, the configurations of FIGS. 11A, 11B, and 11C appear similar, but detailed examination provides insights into the beneficial results from the differences in the design. First, it must be emphasized that the several relationships of the various design features are interconnected in their effects and hence it is the combination of features that allows the unexpected results measured.

To further illustrate the features of the invention, several important relationships within the design are discussed beginning with the Intake Porting of the OPTIMIZED TAPER when compared to the STRAIGHT TAPER or IMPROVED TAPER configurations. The several significant features of these inventions are itemized with letters (A-N). (Here again, it is emphasized that two intake ports and two exhaust ports are desirably provided per cylinder).

Figure 11D:
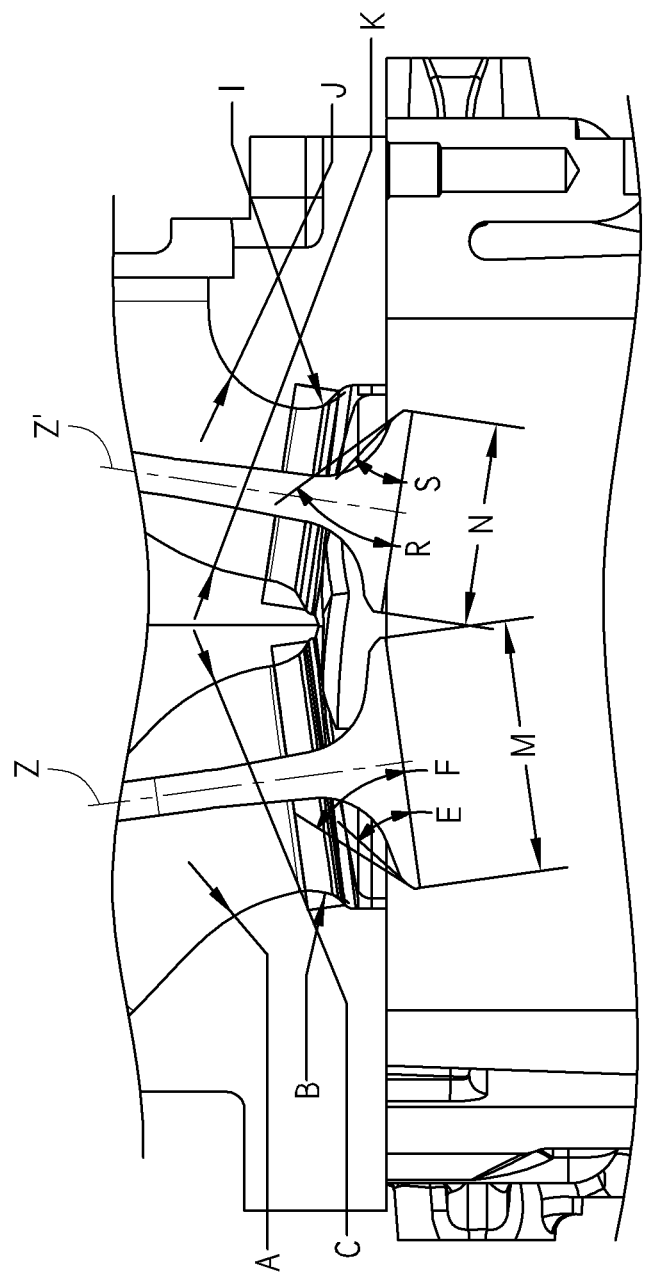
FIG. 11D: Partial View of the OPTIMIZED TAPER Porting System of FIG. 11C FIG. 12: Brake Mean Effective Pressure at Various RPM and Compression Ratios

Examination of FIGS. 11C and 11D in comparison to FIGS. 11A and 11B illustrates these features of this embodiment and the ranges of applicability of the various parameters. One critical parameter for the intake ports are the inside radii (Parameter A, B). These "inside radii" are specifically shaped to allow the flow boundary layer to effectively follow the contour of the shape of the port and thereby deliver air effectively. It is observed that when flow does not follow the inside contour the result is increased pressure in the conduit and resulting reduced flow volume into the cylinder. These relationships are applicable for bore cylinder diameters of 1.5 inch to 7 inch. Further, the bore diameter is directly related to the intake valve diameter which is directly related to the exhaust valve diameter and these parameters affect the other geometric relationships of this intake system.

In some embodiments, including the illustrated embodiment, the intake and exhaust valve shapes at the entrance and exit to the cylinder have two important tapered angles—the valve seat angle and the valve undercut angle. When the valve is viewed in cross-section which contains the line of movement of the valve stem (usually, the axis of the valve stem), as in FIG. 11D, the intake valve seat angle (F) is the angle between the surface most distal from the valve stem at which the intake valve seats or meets the cylinder head port (the "intake valve seating surface") and a plane perpendicular to the axis of movement Z of the valve. Similarly, when the valve is viewed in cross-section, the intake valve undercut angle (E) is the angle between the surface of the valve adjacent to the intake valve seating surface and positioned radially inward therefrom (the "intake valve undercut surface") and a plane perpendicular to the axis of movement Z of the valve. To the extent that there is no planar or flat surface that defines the intake valve seating surface, F is the average intake valve seat angle of the points along intake valve seating surface. Similarly, to the extent that there is no planar or flat surface that defines the intake valve undercut surface, E is average intake valve undercut angle for an undercut surface length of 0.10 inches of the intake valve directly adjacent to the intake valve seating surface and positioned radially inward therefrom. The intake valve seat angle and the intake valve undercut angle dramatically affect air flow and hence combustion, into the combustion chamber and cylinder. Separate ports are desirably provided for each intake and exhaust valve. Shown are the valve seat angle and the valve undercut angle and located on the head are the upper relief and the seat angle. For the intake valve, the valve seat angle (F) has a range of about 40-52 degrees with a preferred embodiment of about 50 degrees or between 48 and 52 degrees and the valve undercut angle (E) range is about 30-42 degrees with the preferred embodiment of about 40 degrees or between 38 and 42 degrees. On the head are located the seat angle with a range of about 40-52 degrees with a preferred embodiment of about 50 or between 48 and 52 degrees. For the exhaust valve, the valve seat angle R is preferably between about 40-52 degrees with a preferred embodiment of about 45 degrees and the valve undercut angle S is preferably between 30-48 degrees with a preferred embodiment of about 35 degrees. Also important to overall air flow through the head is the shape of the intake port angle Q, which is desirably about 50 degrees as measured from a plane perpendicular to the axis defined by the cylinder or between 45 and 65 degrees and in the illustrated embodiment is between approximately 48 and 52 degrees.

The ranges for several characteristic parameters defined in FIGS. 11C and 11D are preferably within the following ranges.

1.5 inches<P<7 inches (Cylinder Bore Diameter range (inches))

0.55 inches<M<2.56 inches (intake valve diameter range (inches))

Similarly and equally important for the overall performance of the intake system are the exhaust ports. The intake port configuration and the exhaust port configuration are inter-related because despite abundant air into the cylinder the failure to exhaust the combusted gases results in lower overall performance.

0.44 inches<N<2.06 inches (exhaust valve diameter range (inches))

0.4 inches<A<1.5 inches (first intake port inside radius range (inches))

Experiments have shown that the first intake port inside radius transitioning to the second inside port radius is critical to obtaining a flow that does not separate when entering the port.

0.13 inches<B<0.7 inches (second intake port inside radius range (inches))

0.4 inches<G<1.85 inches (minimum intake port diameter range (inches))

0.64 inches<H<3.05 inches (maximum intake port diameter range (inches))

Another important parameter is the taper of the intake port. The use of a taper produces a "nozzle-like" effect and accelerates the flow (via suction) into the cylinder, as seen in FIGS. 11C and 11D.

0.45 inches<C<2.1 inches (intake bowl radius range (inches))

The parameter (C), the outside radius of the intake, establishes a "bowl" that allows greater volume in the port just prior to entrance to the cylinder, thereby producing a velocity gradient from its surface to the curving centerline of the port which interacts with the velocity gradient from the inside radii and interacting, especially at greater valve lift levels, that increases flow.

0.4 inches<L<1.93 inches (exhaust port diameter range (inches))

In addition, the exhaust ports can "choke" flow if not in the appropriate shape and size hence the appropriate ranges for this parameter is specified.

0.12 inches<I<0.56 inches (exhaust port first inside radius (inches))

0.2 inches<J<0.98 inches (exhaust port second inside radius (inches))

0.63 inches<K<3.22 inches (exhaust port outside radius (inches))

Again, a subtle difference between the OPTIMIZED TAPER, the STRAIGHT TAPER and the IMPROVED TAPER are the angles E and F defining the intake valve. Experiments have shown that reducing the angles of the valve tend to reduce friction losses and again improve flow. These are indicated by the following ranges.

45 deg<F<53 degrees; but preferably F=50 degrees in the preferred embodiment 35 deg<E<43 degrees; but preferably E=40 degrees in the preferred embodiment Another important parameter is the relationship of the intake valve(s) diameter (M) to the exhaust valve diameter (N). This relationship reflects the preference of the intake valve and exhaust valve projected area of the cylinder to be less than the diameter of the cylinder and allow space between the four valves in each cylinder. This is shown in the below relationship.

1.5<2M+2N<7

45 degree<Q<55 degree Intake Port Angle 30 degree<S<40 degree Exhaust Valve undercut angle 40 degree<R<50 degree Exhaust Valve seat angle The Intake Port Angle (Q) is important as it facilitates flow into the intake port and is convenient for engine layout.

Experiments have shown that the exhaust valve undercut angle (S) and exhaust valve seat angle (R) combine to facilitate flow out of the combustion cylinder bore and thereby prevents a "choking" of the flow that would inhibit the overall engine performance. As illustrated in FIGS. 11C and 11D, when the valve is viewed in cross-section, the exhaust valve seat angle (R) is the angle between the surface most distal from the valve stem at which the exhaust valve seats or meets the cylinder head port (the "exhaust valve seating surface") and a plane perpendicular to the axis of movement Z' of the exhaust valve. Similarly, when the valve is viewed in cross-section, the intake valve undercut angle (S) is the angle between the surface of the valve adjacent to the exhaust valve seating surface and positioned radially inward therefrom (the "exhaust valve undercut surface") and a plane perpendicular to the axis of movement Z' of the exhaust valve. To the extent that there is no planar or flat surface that defines the exhaust valve seating surface, R is the average exhaust valve seat angle of the points along intake valve seating surface. Similarly, to the extent that there is no planar or flat surface that defines the exhaust valve undercut surface, S is average intake valve undercut angle for an undercut surface length of 0.10 inches of the intake valve directly adjacent to the intake valve seating surface and positioned radially inward therefrom.

Note that the intake port radii A and B and the intake bowl radius C provide a substantial benefit by helping to pull air in to the middle of the combustion chamber within the cylinder to provide optimal fuel/air mixing and improved combustion. Additionally, the exhaust port radii I, J, and K also provide an important benefit in facilitating flow out of the cylinder and preventing a "choking" of the exhaust flow that would inhibit overall engine performance.

Additionally, the length O of the tapered intake port to the amount of taper provides a substantial benefit. As the intake air flows through the tapered intake port, the flow velocity increases as the intake port narrows. In combination with the intake port radii A and B and the intake bowl radius C, the length O of the tapered intake port assists with air/fuel mixing and combustion within the combustion chamber.

Again, it should be emphasized that the combination of several parameters achieves the recited unexpected results. It is clear to someone skilled in the art that using one or more of these parameter will improve results, but the combination of these parameters discussed above produces the recited unexpected results.

The availability of greater power also results in greater heat in the piston/cylinder during combustion. The greater heat influx of air should be offset by adequate cooling methods, and hence air cooling for the MC4S engine for a motor cycle will likely be insufficient and water cooling is preferred.

It is also important to observe that greater air flow for a specified amount of valve lift allows the option of shorter valve lift. Shorter valve lift results in less time and less impact on the valve resulting in greater engine endurance.

It should also be noted that the MC4S engine utilizes dual separate intake ports in order to provide the benefits of greater power. However, dual intake ports require a large amount of space. In order to accommodate this space constraint, use of an over square large bore short stroke engine construction is preferred. The characteristic parameters of the MC4S over square engine are discussed above.

Further, the use of dual intake ports allows the trajectory of the air flow to meet at a desired location in the cylinder producing better air-fuel mixing. The improved air-fuel mixing allows the use of lower quality fuels, such as commercial fuels found in gas stations, an important design objective.

The intake porting system also produces greater power because of the size of the ports. Due to the size of the intake ports, the preferred embodiment occupies greater space than conventional porting systems and hence the pistons are best placed in line of the axis of the vehicle. In this configuration, the pistons will fire in a highly uniform and smooth manner (as compared to a V-twin, for example, which are notorious for high levels of vibration). To further enhance the uniform and smooth behavior of the engine, counter-rotating crankshafts are used rather than a single crank. Therefore, achievement of greater power with the disclosed porting system directly leads to the preferred use of counter-rotating crankshaft as to not lose the benefits of the porting system.

Figure 12:
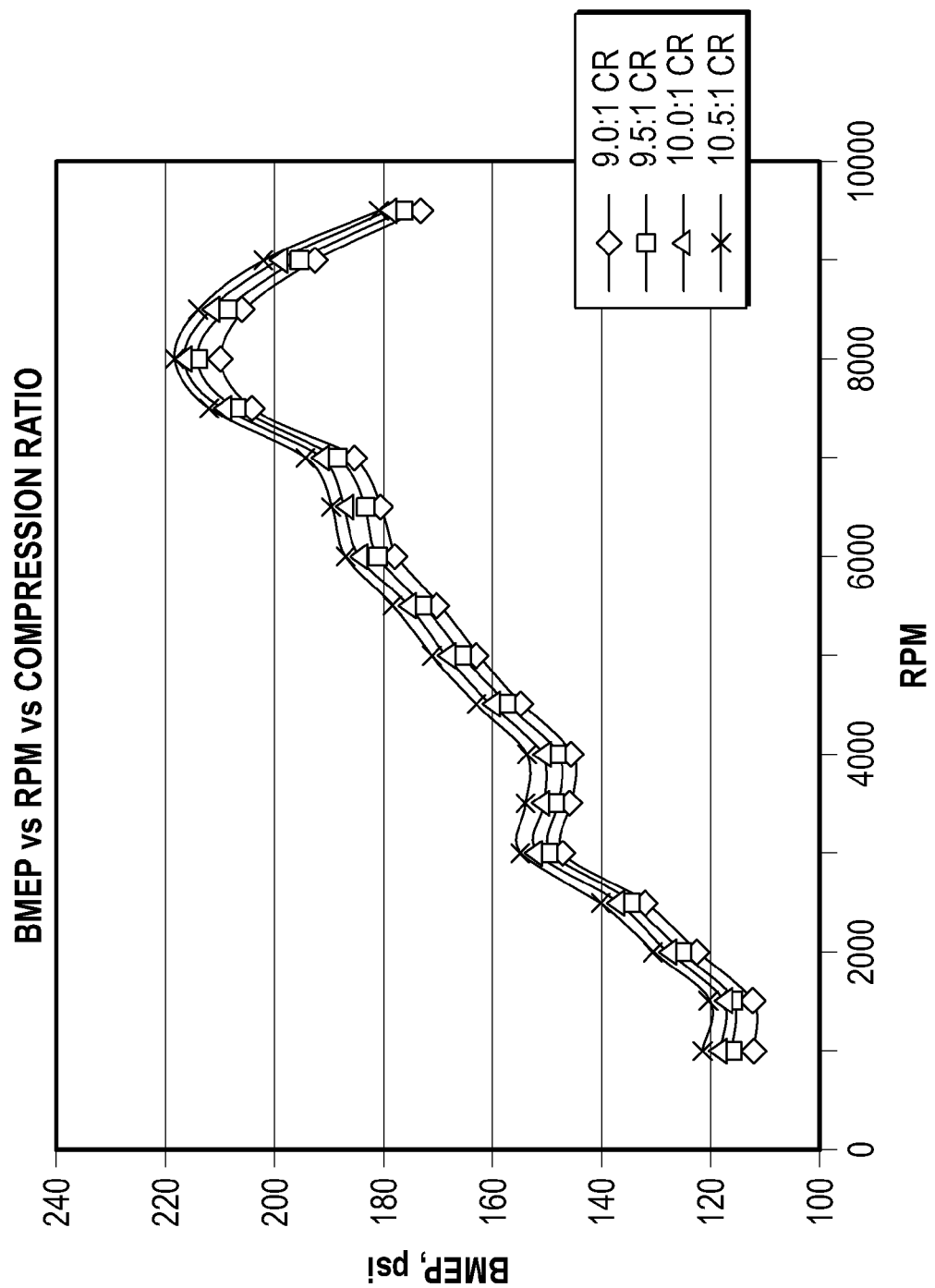

Effects and Significance of Change in Compression Ratio on Brake Mean Effective Pressure on MC4S Engine Various compression ratios were investigated for the MC4S engine via simulations. In separate efforts, this simulation method has been shown to be within 1% of predicted values, and therefore is usually indicative of anticipated physical results. FIG. 12 shows these investigations for the OPTIMIZED TAPER porting system shown above.

Figure 13:
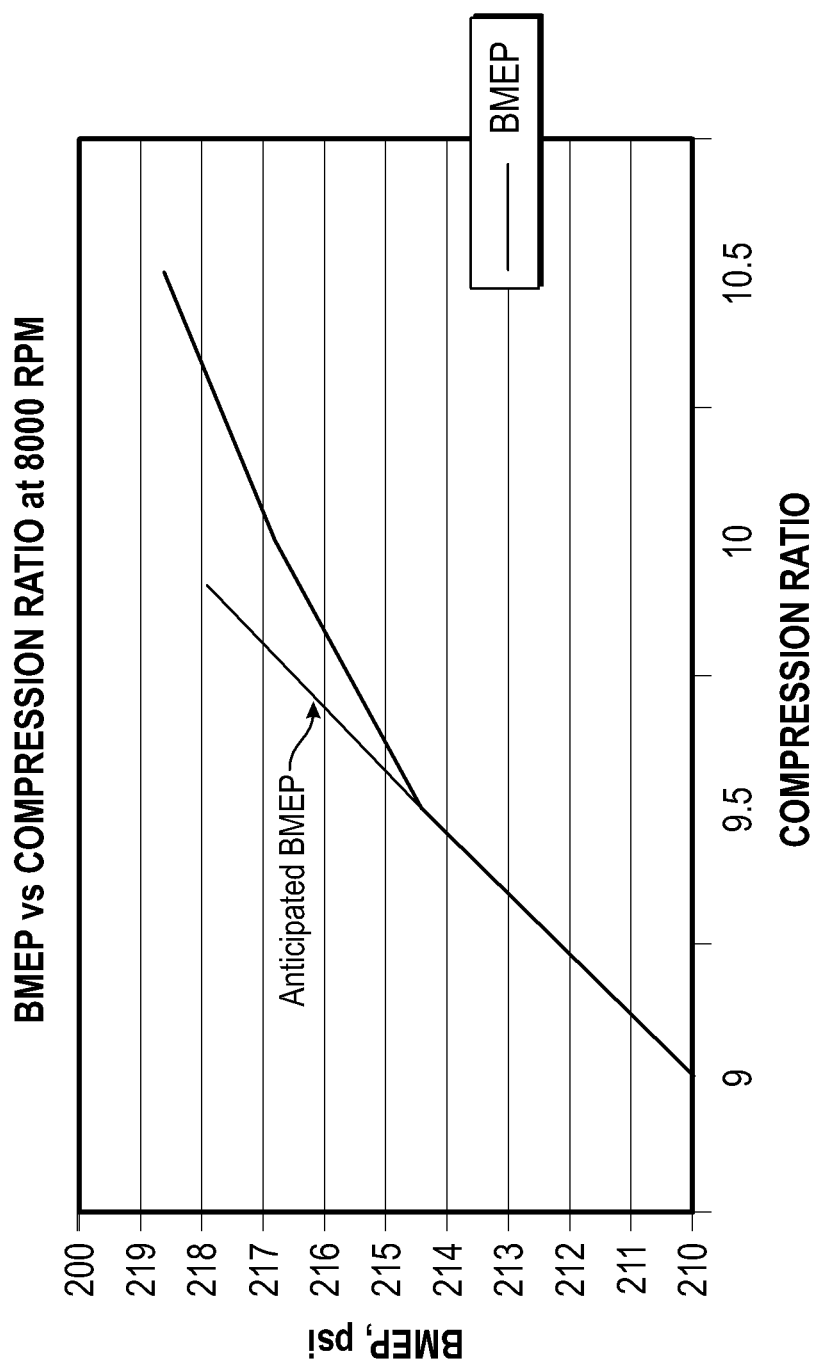
FIG. 13: Peak BMEP for MC4S Engine over a Range of Compression Ratios

FIG. 12 examines the peak BMEP for the MC4S engine with the OPTIMIZED TAPER porting system for a range of Compression Ratios from 9.0 to 10.5. As observed in FIG. 12, the peak BMEP occurs at approximately 8000 rpm. In FIG. 13, the peak BMEP at a fixed RPM is plotted for various compression ratios. Importantly, it should be noted that the peak BMEP for the MC4S system is more than 100% greater than most normally aspirated engines. This unexpected result points to a very powerful engine resulting from the improved air supply.

Examination of FIG. 13 further reveals an unanticipated result of the disclosed engine design. In most naturally aspirated intake systems, the BMEP is significantly increased with increasing compression ratio. However, with the MC4S engine intake system as discussed above, the effect of increasing compression ratio levels off. This leveling off indicates that over the range of practical compression ratios, significant increase in CR does NOT produce significant increase the already significantly high BMEP. As a result, the engine can operate at a lower CR and still produce significant power. It is well known that lower compression ratios result in lower loads on pistons, piston rods, and bearings. As illustrated in the above figures, the MC4S engine produces high power and has simultaneously long endurance at a lower compression ratio than other engines with naturally aspirated intake systems.

Additionally, higher CR increases the proclivity for detonation. The MC4S engine as disclosed preferably effectively reduces the proclivity for detonation without the significant loss of power, as it is able to produce high power at a lower compression ratio. Specifically, the loss of power with lower compression ratio is typically greater than 4% for most other naturally aspirated engines while the loss of power in the MC4S engine is less than 2%, i.e., 50% less power loss because of the porting system of the MC4S.

Although not empirically verified at this time, the unexpected advantage of the MC4S engine is that greater "breathing" of the engine is of greater importance than compression ratio, which is the opposite from conventional systems.

Effects and Significance of Intake/Exhaust Flow on Power

Simulations were also run to determine the effects of variations in the exhaust port size compared with the fixed intake port configuration discussed above for maximizing engine horsepower.

Figure 14:
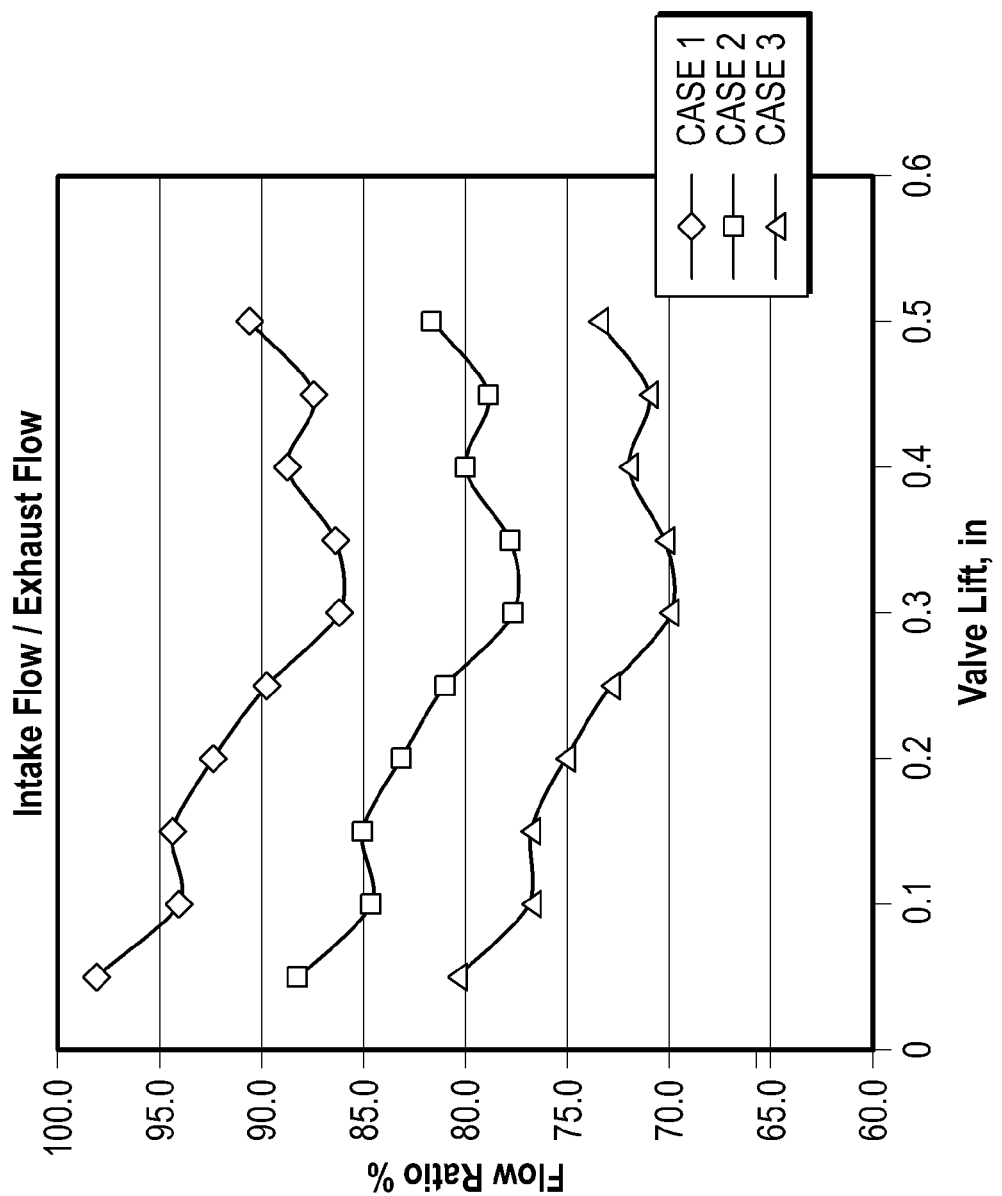
FIG. 14: Effects on Flow Ratio (Intake/Exhaust) for Various Valve Lift Positions

FIG. 14 shows the variation of Intake/Exhaust Flow rates at various valve lift positions for three porting system configurations. Case 3 illustrates data from the STRAIGHT TAPER configuration shown in FIG. 11A which is an example of an overly restrictive exhaust. Case 2 illustrates data from the IMPROVED TAPER port configuration and is an intermediate example of exhaust. Case 1 illustrates data from the OPTIMIZED TAPER porting system and is an example of fully developed exhaust flow for the specified intake.

As illustrated in FIG. 14, Cases 1 and 2 (the OPTIMIZED TAPER porting system and the IMPROVED TAPER porting system) produce higher intake/exhaust flow ratios at a given valve lift position than Case 3 (the STRAIGHT TAPER porting system). This is indicative of the increased "breathability" of the MC4S engine.

Figure 15:
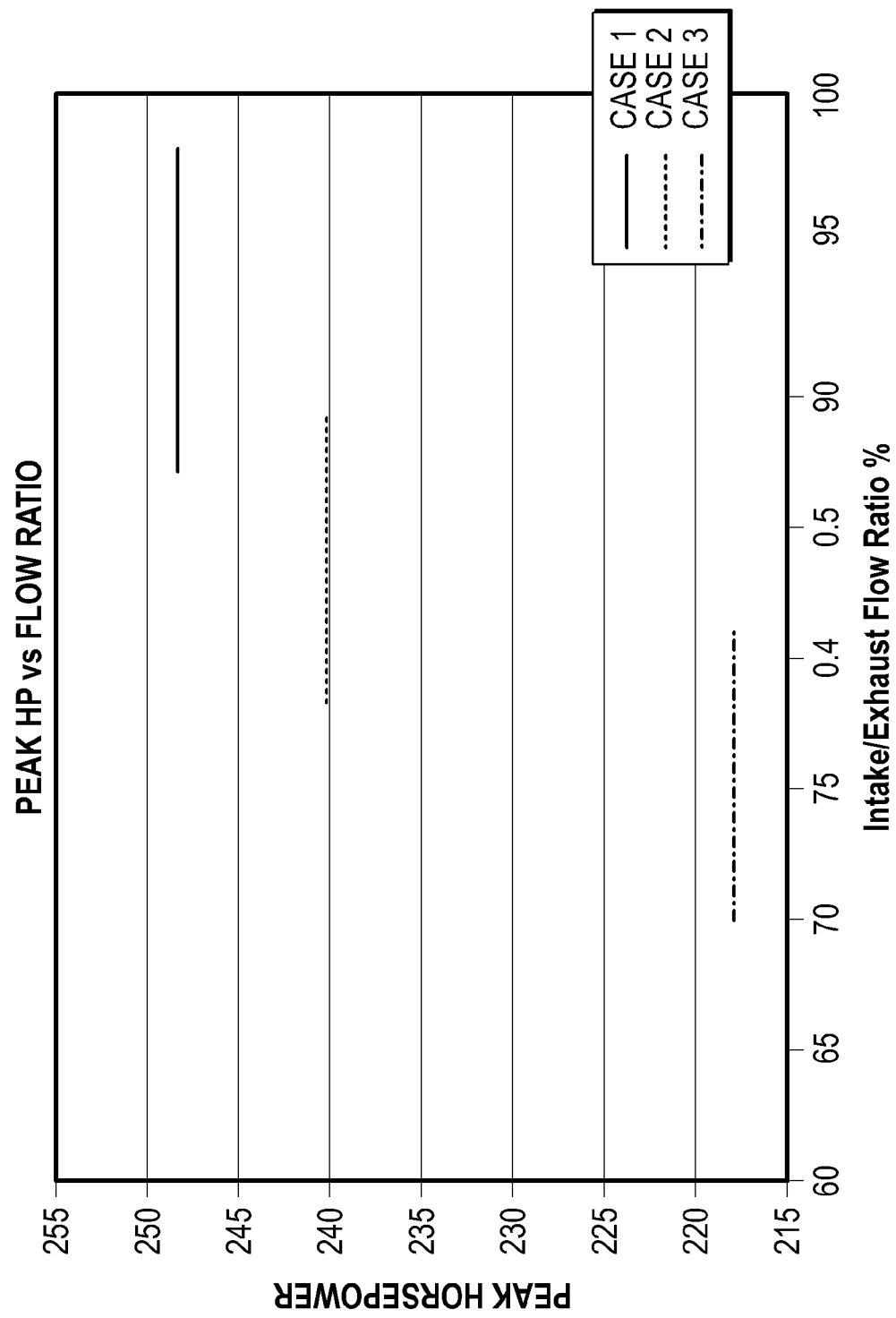
FIG. 15: Effects on Peak Horsepower for Various Intake/Exhaust Flow Ratios

Examination of FIG. 15 shows the effect of the range of intake/exhaust flow rates on horsepower. The range of intake/exhaust flow is defined as the maximum to minimum flow rates during the lifting of the both the intake and exhaust valve 0.5 inches. It can been seen from FIG. 15 that Case 1 and Case 2 (the OPTIMIZED TAPER porting system and the IMPROVED TAPER porting system, respectively) produce significantly greater power than Case 3 (the STRAIGHT TAPER porting system).

FIG. 15 illustrates several unexpected results. First, Case 1 and Case 2 (the OPTIMIZED TAPER porting system and the IMPROVED TAPER porting system, respectively) produce very similar peak horsepower. The expected result would be that each range of percent intake to exhaust flow would be approximately evenly spaced.

This leads to the insight that the MC4S engine preferred embodiment for the intake/exhaust flow should preferably be in the range 86-98% flow, with the range of 78-88% as another but less preferred range, and flows less than 78% are not deemed adequate for this engine because of reduced horsepower.

Even though the features illustrated above may be described as important or even critical, it is not suggested that significant benefits cannot be achieved without the specific feature being discussed.

What is claimed is:

1. An internal combustion engine comprising a first cylinder having a first piston and a second cylinder having a second piston, a first crankshaft operably connected to the first piston and a second crankshaft operably connected to the second piston, a cylinder head comprising at least one intake port and at least one exhaust port per cylinder, said at least one intake port connected to the first cylinder such that fluid can pass through the at least one intake port into the first cylinder and said at least one exhaust port connected to the first cylinder such that fluid can pass from the first cylinder through the at least one exhaust port, a movable intake valve positioned at least partially within the at least one intake port configured to control the flow of fluid through the intake ports, a movable exhaust valve positioned at least partially within the at least one exhaust port configured to control the flow of fluid through the at least one exhaust port, the at least one intake port having a minimum intake port diameter, a first inside radius positioned toward an intake port valve seat from the minimum intake port diameter, said first inside radius transitioning to a second inside radius positioned toward the intake port valve seat from the first radius so that the intake port expands to meet the intake port valve seat, the first inside radius being greater than 0.4 inches and less than 1.5 inches, the second inside radius being greater than 0.13 inches and less than 0.7 inches, the at least one intake port having a non-symmetric variable shape along at least a portion of a length of the at least one intake port, said movable intake valve defining an intake valve seat angle measured between the surface of the movable intake valve most distal from an intake valve stem of the movable intake valve and a plane perpendicular to the axis of movement of the movable intake valve, said intake valve seat angle being between about 40-52 degrees, said movable intake valve defining an intake valve undercut angle measured between the surface of the movable intake valve adjacent to an intake valve seating surface defined b the intake valve seat angle and positioned radially inward therefrom and a plane perpendicular to the axis of movement of the movable intake valve, said intake valve undercut angle being between about 30-42 degrees, said movable exhaust valve defining an exhaust valve seat angle measured between the surface of the movable exhaust valve most distal from an exhaust valve stem of the moveable exhaust valve and a plane perpendicular to the axis of movement of the movable exhaust valve, said exhaust valve seat angle between about 40-52 degrees, said movable exhaust valve defining_an exhaust valve undercut angle measured between the surface of the movable exhaust valve adjacent to an exhaust valve seating surface defined by the exhaust valve seat angle and positioned radially inward therefrom and a plane perpendicular to the axis of movement of the movable exhaust valve, said exhaust valve undercut angle being between about 30-48 degrees, and an intake port angle of the at least one intake port is between about 45 and 65 degrees, wherein the first crankshaft rotates in a first direction and the second crankshaft rotates in a second direction such that the second direction is an opposite direction from the first direction.

2. The engine of claim 1, wherein a bore of each of the first and second cylinders is greater than 3.0 inches.

3. The engine of claim 1, wherein a compression ratio of the engine is between 9.1 and 13.5 and an oversquare ratio of the engine is greater than 1.0.

4. The engine of claim 1, wherein a squish area of each piston is between 24%-35% of an area of the piston.

5. An internal combustion engine comprising a first cylinder having a first piston and a second cylinder having a second piston, a first crankshaft operably connected to the first piston and a second crankshaft operably connected to the second piston, a cylinder head comprising at least one intake port and at least one exhaust port per cylinder, said at least one intake port connected to the first cylinder such that fluid can pass through the at least one intake port into the first cylinder and the at least one exhaust port connected to the first cylinder such that fluid can pass from the first cylinder through the at least one exhaust port, a movable intake valve positioned at least partially within the at least one intake port configured to control the flow of fluid through the at least one intake port, a movable exhaust valve positioned at least partially within the at least one exhaust port configured to control the flow of fluid through the at least one exhaust port, the at least one intake port having a minimum intake port diameter and a tapered portion upstream of said minimum intake port diameter, a first inside radius positioned toward an intake port valve seating surface from the minimum intake port diameter, said first inside radius transitioning to a second inside radius positioned toward the intake valve port seating surface from the first radius so that the intake port expands to meet the intake valve port seat, the first inside radius being greater than 0.4 inches and less than 1.5 inches, the second inside radius being greater than 0.13 inches and less than 0.7 inches, the at least one intake port being nonsymmetrical, said movable intake valve defining an intake valve seat angle measured between the surface of the movable intake valve most distal from an intake valve stem of the movable intake valve and a plane perpendicular to the axis of movement of the movable intake valve, said at least one intake valve seat angle being between about 48-52 degrees, said movable intake valve defining an intake valve undercut angle measured between the surface of the movable intake valve adjacent to an intake valve seating surface defined by the intake valve seat angle and positioned radially inward therefrom and a plane perpendicular to the axis of movement of the movable intake valve, said intake valve undercut angle being between about 38-42 degrees, and an intake port angle of the at least one intake port is between about 45 and 65 degrees, wherein the first crankshaft rotates in a first direction and the second crankshaft rotates in a second direction such that the second direction is an opposite direction from the first direction.

6. The engine of claim 5, wherein a bore of each of the first and second cylinders is greater than 3.0 inches.

7. The engine of claim 5, wherein a compression ratio of the engine is between 9.1 and 13.5 and an oversquare ratio of the engine is greater than 1.0.

8. The engine of claim 5, wherein a squish area of each of the first and second pistons is between 24%-35% of an area of the piston.

9. The engine of claim 5, wherein the first crankshaft rotates in a first direction and the second crankshaft rotates in a second direction that is opposite the first direction.

10. The engine of claim 5, wherein at least a majority of a cross-section of a valve seating surface is straight such that at least a majority of an overall shape of the valve seating surface is cone-shaped.

11. The engine of claim 5, wherein at least a majority of a cross-section of a valve undercut surface is straight such that at least a majority of an overall shape of the valve undercut surface is cone-shaped.

\* \* \* \* \*